US007257628B2

(12) United States Patent
Liskov et al.

(10) Patent No.: US 7,257,628 B2
(45) Date of Patent: Aug. 14, 2007

(54) METHODS AND APPARATUS FOR PERFORMING CONTENT DISTRIBUTION IN A CONTENT DISTRIBUTION NETWORK

(75) Inventors: Barbara Liskov, Waltham, MA (US); Dmitry Stavisky, Wayland, MA (US); Stephen Jeffrey Morris, Harvard, MA (US); Dan Li, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 962 days.

(21) Appl. No.: 10/602,971

(22) Filed: Jun. 23, 2003

(65) Prior Publication Data

US 2005/0076104 A1    Apr. 7, 2005

Related U.S. Application Data

(60) Provisional application No. 60/425,124, filed on Nov. 8, 2002.

(51) Int. Cl.
*G06F 15/173* (2006.01)
*G06F 15/16* (2006.01)

(52) U.S. Cl. .................. 709/223; 709/227; 709/238

(58) Field of Classification Search ............... 709/223, 709/227, 238, 224, 225, 201
See application file for complete search history.

(56) References Cited

U.S. PATENT DOCUMENTS

| 2002/0161767 | A1* | 10/2002 | Shapiro et al. | 707/9 |
| 2003/0079027 | A1* | 4/2003 | Slocombe et al. | 709/229 |
| 2003/0101253 | A1* | 5/2003 | Saito et al. | 709/223 |
| 2004/0024886 | A1* | 2/2004 | Saxena | 709/229 |

FOREIGN PATENT DOCUMENTS

| EP | 0 967 559 A1 | 12/1999 |
| WO | WO/ 01/77841 A2 | 10/2001 |

OTHER PUBLICATIONS

Katia Obraczka, et al., "A Tool for Massively Replicating Internet Archives: Design, Implementation, and Experience", Distributed Computing Systems, 1996., Proceedings of the 16th International Conference on Hong Kong May 27-30, 1996, Los Alamitos, CA, USA, IEEE Comput. Soc, Us, May 27, 1996, pp. 657-664, XP010167640.

* cited by examiner

*Primary Examiner*—Krisna Lim
(74) *Attorney, Agent, or Firm*—Chapin IP Law, LLC; Barry W. Chapin, Esq.

(57) ABSTRACT

Mechanisms and techniques provide a system that operates in a computerized device(s) to establish a data distribution path for content within a content distribution network by receiving a network topology definition defining at least one hierarchical interconnection of network groups. Each network group comprises at least one content engine. The system also receives a channel definition comprising a selection of a plurality of content engines that are to distribute content within the content distribution network. The plurality of content engines in the channel definition is selected from content engines within the network groups defined within the network topology definition. The system determines an assignment of at least one root content engine within the channel definition and applies a content distribution path determination technique to the network topology definition in relation to the channel definition to determine a set of content distribution paths in the content distribution network to be used for distribution of content from the root content engine(s) to the content engines defined in the channel definition.

35 Claims, 6 Drawing Sheets

METHODS AND APPARATUS FOR PERFORMING CONTENT DISTRIBUTION IN A CONTENT DISTRIBUTION NETWORK

PRIORITY TO PROVISIONAL PATENT APPLICATION

This Applicaation for Patent claims the benefit of the filing date of formerly filed, now abandoned, U.S. Provisional Application for Patent entitled "METHODS AND APPARATUS FOR PERFORMING CONTENT DISTRIBUTION IN A CONTENT DISTRIBUTION NETWORK", having U.S. Ser. No. 60/425,124, filed Nov. 8, 2002 and assigned to the same Assignee as the present invention. The entire teachings, disclosure and contents of this referenced provisional patent application are hereby incorporated by reference herein in their entirety.

BACKGROUND OF THE INVENTION

Computer networks such as the Internet allow computer systems to exchange content (e.g., data) in a variety of ways. One technique for accessing content over a computer network such as the Internet operates by using a suite of protocols collectively referred to as the World Wide Web. In a typical operation of the world wide web, a user at a client computer system operates a client software application such as a web browser to access content served by a web server computer system over the computer network. The content may be any type of data or information such as documents, web pages, files, database information, streams of audio and/or video data or the like that the web server transmits over the data communications network to the web browser operating in the client computer system. Similar data communications mechanisms and techniques allow client computer systems such as web site kiosks to periodically retrieve content such as advertising audio or video data from one or more content server computer systems in order to present the information to individuals such as corporate customers who interact with the kiosks.

Client computer systems that require the ability to access content using the aforementioned techniques may be connected to a computer network such as the Internet at diverse geographic locations. In such situations, a producer, provider or other originator of the content may utilize a group of technologies collectively called a content distribution network to disseminate or distribute the content to many content server computer systems called content engines located within the different geographic regions of the computer network (e.g., located in various local area network installations) for future access by client computer systems that request this content from the content engines. Generally then, a content distribution network or CDN is a collection of computer systems (e.g., content engines and content routers) that interoperate with each other to efficiently provide portions of content to requesting client computer systems. The various portions of content distributed within a content distribution network may be related in some manner, such as being provided from a single content provider or may be related by the type of content. A content distribution network typically includes a content router (e.g., operating as a load balancer) and one or more content engines that operate as servers (e.g., web servers) to serve content requested by content requests sent from client computer systems to the content router. The content router receives client requests for content and using various content routing techniques decides which content engine is to service those client requests. The content router then redirects the client requests to the appropriate content engine. This redirection may be based on numerous factors such as the geographic proximity of the requesting client to an available content engine containing the requested content, or on the specific content requested, or on load balancing considerations between multiple available content engines. A content engine that receives a redirected request from client computer system typically operates to serve the requested content back to those clients, though the content engine may perform further redirection techniques as well in some instances.

As an example of the operation of a content distribution network, a user controlling a web browser operating on a client computer system may select a Uniform Resource Locator (URL) that references a specific portion of content served by the content distribution network. A domain name specified within the URL might generally reference the content distribution network itself, such as www.CDN.com and protocols such as the Domain Naming System (DNS) can initially direct that client content request to a content router associated with that content distribution network. Through various redirection techniques (e.g., Domain Naming System redirection and/or Hypertext Transport Protocol redirection), the content router that receives the client request for content can redirect this client request to an address of a specific content engine within (i.e., associated with) the content distribution network based on the aforementioned routing criteria (e.g., the geographic location of the client requesting the content, load balancing considerations made between the various content engines, and so forth). A content engine that receives the redirected content request can then process this request to serve the requested content to the client computer system.

As explained above, a conventional content delivery network accelerates access to content on behalf of client computer systems that request the content by distributing the content for receipt and local storage at content engines distributed throughout a computer network such as the Internet. Rather than all client computer systems requesting the same content from a single content provider computer system (e.g., sometimes referred to as an origin server), individual client computer systems are able to obtain the requested content from a content engine computer system (i.e., a server) that is "close" to the client and that locally stores the required content. This improves a client's performance with respect to access to the content for a number of reasons. The client computer system may be much closer in network terms (e.g., number of network hops) to the content engine computer system as compared to the content provider computer system. In addition, the data communications link from the client computer system to the content engine may be a high-speed connection while one or more data communications links (e.g., a satellite link) along the network path from the client computer system to the content provider computer system may be a relatively slow data communications links. As a result, the client computer system can access the content faster (i.e., can get better response) from the more local content engine computer system than from the more distant or remote content provider computer system. In addition, by having many content engine computer systems distributed throughout a computer network, the load, demand and bandwidth requirements of each content engine computer system and can be less since each content engine only needs to serve content to certain client computer systems.

Various conventional techniques and mechanisms also exist for distributing the content from the content provider computer system to the selection of content engines distributed through a computer network such as the Internet in order to accelerate access to the content by client computer systems. Such techniques essentially pre-position the content within each of the content engine computer systems for subsequent servicing of client requests for the content. As an example, each content engine can periodically contact a master content provider computer system to determine if additional content is available for storage within the content engine. If the content engine determines that the master content provider computer system contains content that the content engine may require later to serve to client computer systems, that content engine can obtain a copy of this content to maintain within local storage in order to service subsequently received client requests for this content. The conventional content engine may use a standard data access protocol such as the File Transfer Protocol (FTP) in order to access or download the content from the content provider computer system.

Pre-positioning content within content engines is especially important when the content is very large or in situations where there is a low speed connection between the content provider computer system and the content engine that will cache or otherwise store the content for access by requesting client computer systems.

SUMMARY OF THE INVENTION

Conventional techniques for distributing content from content provider computer systems such as origin servers to content engine computer systems (i.e., servers) suffer from a variety of deficiencies. Such deficiencies arise from the fact that there exists little imposed restraints on how conventional content distribution techniques within a content distribution network allow each content engine to directly retrieve required content from the content provider computer system in order to pre-position the content within each content engine. As an example, pre-positioning large portions of content from a content provider computer system to many content engines across a relatively slow data communications link (e.g., a satellite link) can consume large amounts of network bandwidth and can pose a significant processing burden on the content provider computer system and the associated slow data communications link in order to service each content engine that requests the large content to be pre-positioned.

In addition, conventional techniques for pre-positioning content within content engines are not organized so that a particular portion of content crosses a relatively slow data communications link only once. Accordingly, in network configurations in which a number of content engines communicate with the content provider computer system over a slow data communications link such as a satellite link, each content engine may attempt to access the content directly from the content provider computer system over the same slow satellite link. Even in conventional systems in which one content engine may retrieve content for pre-positioning from another content engine that is different than the content provider computer system, no consideration is given to the relative bandwidth of communications links along a content distribution path of the content from the content provider computer system to a first content engine and then from the first content engine to a second content engine.

Further still, conventional mechanism for pre-positioning content within content engines do not take into account certain network considerations such as the possible existence of firewalls between a content engine attempting to retrieve content and a content provider computer system. The existence of a firewall data communications device between the content engine and content provider may inhibit the use of certain network protocols that are required for access to the content by the content engine. Since conventional content distribution techniques do not have mechanisms for notification of the existence of firewalls within a selected distribution path for pre-positioning content, a content distribution network operator may assume content engines have access to content when they actually do not have such access.

More specifically, embodiments of the invention provide mechanisms and techniques that significantly overcome the aforementioned deficiencies in conventional content distribution network systems that support distribution of content from one or more content provider computer systems such as origin servers to content engine computer systems. The current invention provides an alternative approach and embodiments of the invention result in building good paths for data distribution. Unlike certain conventional systems, embodiments of the invention avoid expensive, frequent measurement to determine good paths and embodiments of this invention are capable of forming deep trees rather than just simple data distribution network such as star topologies. In particular, embodiments of the invention operate to receive a network topology definition (e.g., from a user) and to further receive a channel definition of groups of content engines that the user would like to use to distribute content. Using this information, the invention operates to create content distribution trees that allow for the formation of sets of content distribution paths within a network topology definition that defines one or more hierarchical interconnections of network groups of content engines within a content distribution network.

According to the general concepts of embodiments of the invention, a network topology defines an interconnection of content engines (e.g., server computer systems) that are organized into network groups, and the network groups of content engines are arranged into one or more distribution trees with one or more root content engines in root network groups serving as the top of the distribution trees. Each root server content engine in a root network group obtains content from a content provider computer system such as an origin server for subsequent distribution to all non-root content engines within the distribution tree. To define a channel definition, a user such as a content distribution network operator can select which other content engines within the content distribution network (i.e., within one or more of the network groups of content engines) are to receive the specific content. Once a network topology is defined and the user has selected the network groups that contain content engines that are to receive the content (i.e., has provided the channel definition) and an assignment of one or more root content engines is made (thus defining one or more root network groups), embodiments of the invention are able to apply a content distribution path determination technique to determine the specific content network distribution paths within the network topology such that each selected content engine within a non-root selected network group is able to obtain its required content from a content engine that is an ancestor to itself within the distribution tree. Using the technology provided by embodiments of the invention, efficient distribution of content is accomplished from the root content engines to the non-root content engines organized into a hierarchical distribution tree defined by a set of distribution paths between content engines that hierarchically depend (i.e., descend) from the root content engine(s).

Embodiments of the invention provide unique techniques and mechanisms for defining or forming the content distribution paths by applying unique content distribution path determination techniques. The techniques disclosed herein do not consume extensive network resources and the distribution path formation techniques disclosed herein do not substantially interfere with content delivery. In addition, embodiments of the invention operate to define distribution paths that are efficient and can take into account such factors as relatively slow data communications links existing between content engines, firewall conditions that may exist between content engines that allow one directional communication only, and situations that involve a balancing of a number of child content engines that access content from a particular ancestor content engine within the network topology. Accordingly, the content distribution path determination techniques disclosed herein operate to form efficient content distribution paths from root content engines to non-root content engines arranged in a content distribution tree and account for a myriad of conditions that may arise which can affect content pre-positioning efficiency.

In particular, embodiments of the invention provide methods and apparatus for establishing a data distribution path for content within a content distribution network. One such method embodiment comprises the steps of receiving a network topology definition defining at least one hierarchical interconnection of network groups. Each network group comprises at least one content engine. Embodiments of the invention may receive the network topology from a user or in the form of a network topology data structure such as a tree data structure. The method also receives a channel definition comprising a selection of a plurality of content engines that are to distribute content within the content distribution network. The content engines in the channel definition are selected from content engines within the network groups defined within the network topology definition. A group of content engines may be, for example, a local area network group of servers coupled to each other via a network in a facility located in a certain geographic area. All content engines in the same group are assumed to be well-connected to one another; thus there are no firewalls within a group. Also, all content engine servers in a group have similar connectivity to the outside world (i.e., to servers in other groups). Groups are useful because, as will be explained, trees can be built in terms of them and as a result trees can be much smaller. This savings in size and computation is especially important in very large content distribution network systems. Furthermore, multi-server groups occur naturally in many systems. For example, the servers in a group might be in the same POP or data center or all connected by a local area network.

Any network group that contains one or more selected content engines is referred to herein as a "selected" network group. The method also determines an assignment of at least one root content engine within the channel definition. Once the network topology, channel definition, and root content engine assignments are complete, the method applies a content distribution path determination technique to the network topology definition in relation to the channel definition to determine a set of content distribution paths in the content distribution network to be used for distribution of content from the root content engine(s) (i.e., the root network groups) to the content engines defined in the channel definition.

Based on the above summary, each network group in the network topology definition containing a root content engine is a root network group and each network group in the network topology definition that does not contain a root content engine but that contains a selection of at least one content engine in the channel definition is a non-root selected network group. In one embodiment, the step of applying a content distribution path determination technique comprises the step of determining an ideal data distribution path from each non-root network group to at least one root network group in the network topology definition. Note there can be more than one root group in the network topology definition.

In other embodiments, each network group in the network topology that contains a selected content engine within the channel definition is a selected network group and each network group in the network topology that does not contain a selected content engine within the channel definition is a non-selected network group. In one embodiment, the step of determining an ideal data distribution path comprises the step of selecting the ideal data distribution path to include only selected network groups. That is, the eventual content distribution paths or links that are formed are comprised of paths from each non-root content engine to a least one root network group through only the "selected" non-root network groups containing selected non-root content engines and such paths do not include non-selected network groups. A group can be given a single link that connects it to a parent group. A link is annotated to indicate its connectivity. As an example, a two-way link allows communication in both directions (parent to child and child to parent group). A one-way link allows communication only from child to parent group (but not vice versa) and such a link represents a firewall (i.e., the child group is behind a firewall relative to the parent).

In one embodiment of the invention, the step of determining an ideal data distribution path from each non-root network group to at least one root network group in the network topology definition operates for each non-root network group that is a selected network group and performs the steps of determining if the non-root network group shares an ancestor selected network group with the at least one root network group in the network topology. In other words, for a particular selected non-root network group (i.e., a current selected network group), the method determines if there is another selected network group in the network topology (e.g., in a tree containing this current group) that is an ancestor network group node in the tree a root network group. That is, the embodiment determines if the root and the current selected group share a common selected network group as a parent, grandparent, great grandparent, etc. in the network topology (which is a hierarchy). According to this embodiment, if the non-root network group (i.e., the current group being processed in this iteration of a loop that occurs for all selected non-root network groups) shares an ancestor selected network group with the root network group, then the method defines the ideal data distribution path from the non-root network group to root network group to include all selected groups interconnected by a path of links in the network topology beginning at the non-root network group and extending to the ancestor selected network group, and then further extending from the ancestor selected network group to the root group that shared the ancestor selected network group with the non-root network group. In this manner, this processing is done for each selected non-root network group in order to determine a content distribution path from that group back to the root network group. This path is then used to distribute content from the root back to the non-root group along that path.

In another embodiment, the ancestor selected network group shared by the non-root network group and the root network group is a lowest common ancestor selected network group. The lowest common ancestor selected network group is a network group ancestor of both the root and the selected network group and that is closest to each of these groups in the hierarchical network topology.

In another embodiment, the step of determining an ideal data distribution path from each non-root network group to at least one root network group in the network topology definition operates for each non-root network group that is a selected network group and performs the steps of determining if the non-root network group does not share an ancestor selected network group with the at least one root network group in the network topology. If the selected non-root network group does not share an ancestor selected network group (i.e., a group having a content engine in the channel definition) with the root network group, then the method embodiment defines the ideal data distribution path from the non-root network group to the root network group to include all selected groups interconnected by a path of links in the network topology beginning at the non-root network group and extending to highest ancestor network group associated with the non-root network group, and then extending to the highest ancestor network group associated with the root group, and then extending from the highest ancestor network group associated with the root group to the root group.

In another embodiment, the highest ancestor network group associated with the root network group is the highest selected ancestor network group associated with the root network group (e.g., a top level group). Thus, if a top-level network group of a distribution tree is selected then this is the highest selected ancestor network group. However, if the top network group in the hierarchy is not selected, then the highest selected ancestor group is the highest selected non-top-level network group. Likewise, the same is true for non-root groups regarding their highest ancestor network groups.

In another embodiment of the invention, the step of receiving a network topology definition defining at least one hierarchical interconnection of network groups comprises a step of obtaining identities of a set of content engines that define a network group. Each identified content engine is able to communicate with other identified content engines in the network group. The embodiment repeats the step of obtaining identities of a set of content engines that define a network group in order to define a plurality of network groups within the network topology. The embodiment then processes a loop for each network group that is not a top level network group in the hierarchical interconnection of network groups, and within this processing loop, obtains (e.g., from the user or from a network topology configuration file) at least one (e.g., only one in one embodiment) link definition between that network group and at least one parent network group. The link definition identifies an interconnection of a content engine in that network group and a content engine in the parent group. By link definition and interconnection, what is meant is that a link definition defines a network path between two groups, such that contents engines in those groups can communicate as explained herein. Thus the link definition or interconnection implies that there is a communications path over a network such that one group is coupled to another group over a network (of one or more hops or links) such that any content engine in, for example, a child network group can use this interconnection network (of at least one link definition) to communication with any content engine of a parent group. As will be explained, a link definition linking two network groups can be annotated to indicate or capture information about firewall information (e.g., the ability to only communicate in one direction between two groups), data communications performance between two groups, and so forth.

In a further embodiment, the step of determining an assignment of root content engine(s) within the channel definition comprises the step of designating, as the root content engine(s), at least one content engine within the channel definition that exists in a network group that is highest in the hierarchical interconnection(s) of network groups. In this embodiment then, the root is preferentially assigned to the highest network groups. In a further embodiment, the step of determining an assignment of a root content engine(s) is performed automatically based on a performance metric associated with the at least one content engine and/or a bandwidth metric associated with the root network group that contains the root content engine. In this manner, selection of a root content engine can be performed automatically based on available content engines within the root network group in the channel definition using such a metric. As an example, the content engine highest in the hierarchy and and belonging to the group having the highest bandwidth connection to the Internet could be selected to serve as a root content engine thus making its associated network group the root network group. Alternatively, the user providing the network topology definition can specify the root network group and root content engine manually.

In another embodiment, the method embodiments disclosed above can include the steps of receiving, at one or more root content engine(s), content to be distributed to the plurality of content engines defined in the channel definition. The method then distributes, from the root content engine(s) (i.e., that get the content from origin servers), the content to network groups containing content engines defined in the channel definition (i.e., to selected network groups) using the set of content distribution paths determined from the step of applying a content distribution path determination technique. Note that content may be "pushed" (e.g., sent from root to child) or "pulled" (i.e., child sends request for content to root) to distribute the content from root content engine(s) to child content engines in child network groups, as will be explained in more detail. In this manner, the paths allow content to be disseminated while accounting, as will be explained, for the various conditions that may occur in a network links between groups, such as performance access to root content engines, firewall conditions, and the like.

In one embodiment, the set of content distribution paths comprise a series of interconnected content engines within the channel definition that define a path for transfer of content from the root content engine(s) to the non-root content engines with the non-root network groups. Also, the step of distributing the content comprises the steps of detecting an inability to adequately distribute content through at least one content engine within the set of content distribution paths, and in response to detecting the inability to adequately distribute content, either distributing content using an alternative distribution path selected based on the set of distribution paths produced from the content distribution path determination technique, or warning an operator (e.g., CDN administrator) that the content cannot be distributed.

In still another embodiment, the steps of receiving a network topology definition, receiving a channel definition, determining an assignment of at least one root content engine, and applying a content distribution path determination technique are performed locally within at least one computerized device. In this embodiment, the method also comprises the step of disseminating the set of content distribution paths to at least a portion of the plurality of content engines defined in the channel definition such that each content engine in the plurality of content engines (or in the portion thereof) can determine a distribution path to use to disseminate content within the content distribution network from the root content engine(s). In this manner, the operation of the invention to determine distribution paths can be done in one computerized device and then the distribution path assignments can be sent to each content engine for use. This saves processing burden on each content engine.

In a further embodiment, each of the content engines defined in the channel definition performs the steps of receiving a network topology definition, receiving a channel definition, determining an assignment of at least one root content engine, and applying a content distribution path determination technique such that each content engine in the channel definition independently determines a distribution path to use to disseminate content within the content distribution network from the at least one root content engine. In this manner, each content engine can perform the processing of the invention to determine the paths to use to distribute content from root content engines.

In another embodiment, the step of determining an assignment of at least one root content engine within the channel definition comprises the step of identifying at least one of a set of conditions, such as: a firewall condition in the channel definition in which at least two content engines within the channel definition are capable of communicating in only one direction with respect to the location of the at least one root content engine within the channel definition; an efficiency condition indicating inefficiencies in transferring content in the set of distribution paths; and/or a tree-restructuring condition in which the set of distribution paths are not optimally organized. In response to the step of identifying, embodiments apply a tree restructuring correction technique to restructure the set of distribution paths for the parent network group. As an example, there may be a firewall in between two network groups and communication between content engines in these groups is uni-directional. Using this information, embodiments of the invention can account for firewalls when constructing content distribution trees.

In another embodiment, one of the two (or more) content engines is a root content engine and the step of identifying a firewall condition determines that communication between the root content engine is capable only in a direction that is opposite of a direction required for distribution of content from the at least one root content engine. By providing such identification, this embodiment can alert a content distribution network operator to a potential problem when attempting to disseminate content from the root content engine.

In yet another embodiment, the system determines, for selected parent network groups in the network topology, if a number of selected child network groups for that selected parent network group exceeds a predetermined threshold. The system can also identify a tree restructuring condition and can apply a tree restructuring correction technique to restructure the set of distribution paths for the parent network group. In one embodiment, the system applies a tree restructuring correction technique by comparing a metric of each child network group to the parent network group and to at least one other child network group to determine if that child network group should be a child of that patent network group, and if so, assigns that child network group as a child of the parent network group. If that child network group should be a child of another child network group, then the invention assigns that child network group as a child of the another child network group.

Other embodiments provide a computerized device such as a content router and/or a content engine, that comprises at least one communications interface, a memory, a processor and an interconnection mechanism coupling the communications interface(s), the memory and the processor. In the computerized device, the memory is encoded with an path manager application that when performed on the processor, produces a path manager process that causes the computerized device to determine content distribution paths by performing the processing steps outlined above and explained in detail here with respect to content distribution networks. That is, the computerized device may be any type of data communications device, computerized device, or other device configured with software and/or circuitry to process and perform all of the method operations noted above and disclosed herein as embodiments of the invention. In other words, a computer, web server, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. More particularly, a computer program product is disclosed which has a computer-readable medium including computer program logic encoded thereon that, when executed on at least one processor with a computerized device such as a content router or content engine, causes the processor to perform the operations (e.g., the methods and processing steps) indicated herein that are considered embodiments of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general-purpose electronic device to cause such a device to perform the techniques explained herein as embodiments of the invention.

The embodiments of the invention may be implemented by computer software and/or hardware mechanisms within a data communications device or other computing apparatus. It is to be understood that the system of the invention can be embodied strictly as a software program, as software and hardware, or as hardware and/or circuitry (e.g., a special purpose controller or microprocessor) alone. The features of the invention, as explained herein, may be employed in data communications devices and other computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Figure 1:
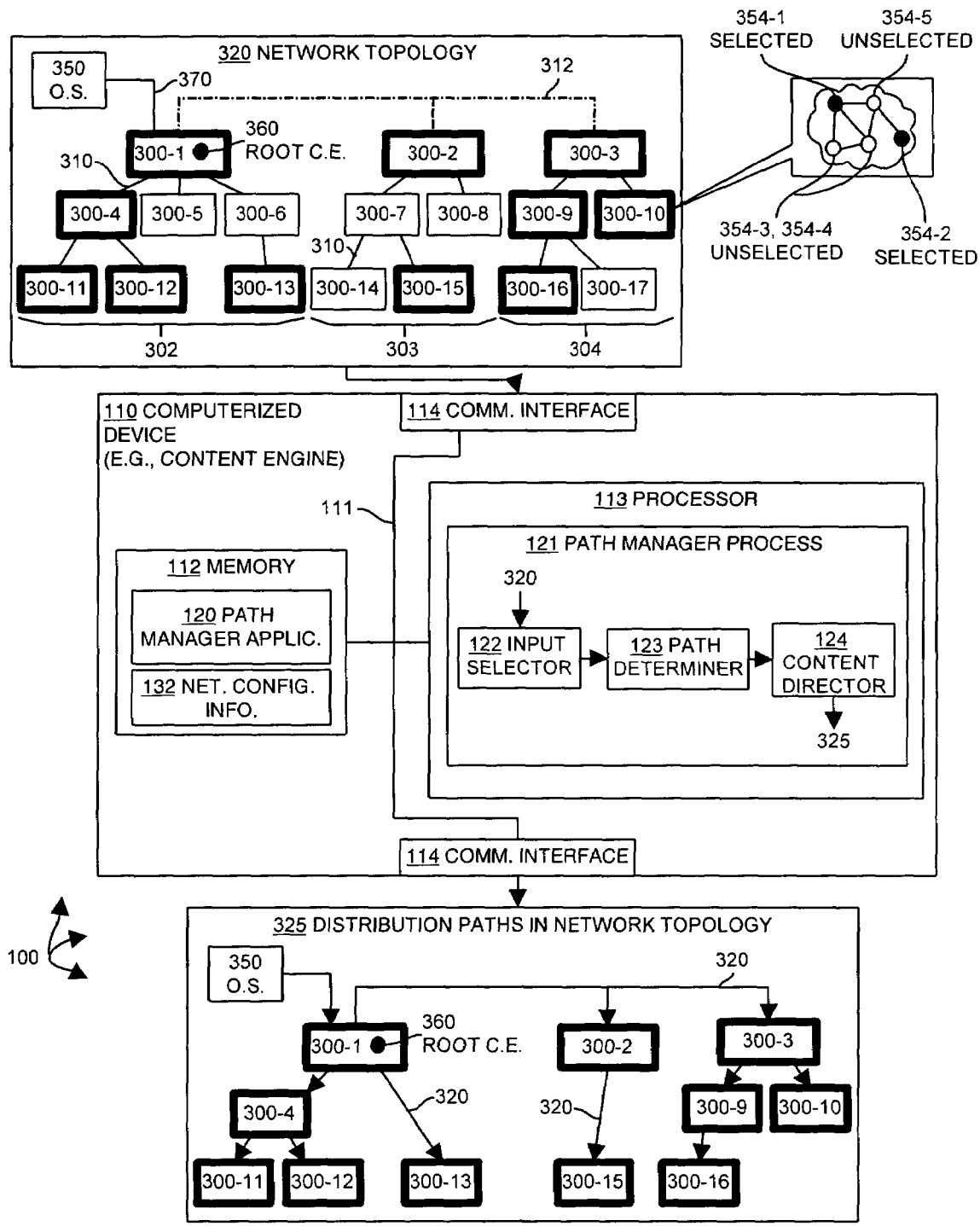
FIG. 1 illustrates an example operation of a computerized device that is suitable for use in explaining the operation of example embodiments of the invention.

Generally, embodiments of the invention operate to create content distribution trees in the form of sets of distribution paths within a hierarchical network topology definition that defines one or more hierarchical interconnections of network groups within a content distribution network. The distribution trees or paths defined as a result of operation of the invention indicate how content can be efficiently distributed from one or more selected root content engines to the remainder of a set of selected network groups within the network topology. Accordingly, the distribution paths define links between network groups of selected content engines (e.g., groups of server computer systems) that are organized into a distribution tree with one or more root content engines serving as the top of the distribution tree. When building the content distribution tree(s) from the root content engines (defining root network groups), embodiments of the invention can take into account such things as firewall conditions that may impede the ability to transfer content in certain directions to one of more content engines, tree balancing issues in which too many network groups of content engines may attempt to get content from a particular network group, and other considerations. In addition, embodiments of the invention can detect load-balancing conditions in which a particular network group is assigned to distribute content to many other network groups, referred to as child network groups. In such cases, embodiments of the invention as will be explained can apply a tree balancing technique to reassign child network groups from that parent to reduce the number of network groups that a particular parent network group is required to distribute content towards.

In operation, each root server content engine obtains content from a content provider computer system such as an origin server for subsequent distribution to all non-root content engines within the distribution tree produced or defined by the invention. To establish the distribution paths for this content, embodiments of the invention receive, as input, a hierarchical network topology as well as a selection of content engines referred to herein as a channel definition. The selected content engines exist in various network groups, referred to as "selected" network groups, within the network topology. Embodiments of the invention assign or receive a selection of one or more content engines to serve as root content engines, thus defining one or more root network groups. Thereafter, to establish the distribution paths from the root content engines to each of the other selected non-root content engines in the other non-root network groups within the network topology, embodiments of the invention form the distribution tree by applying a unique content distribution path determination technique. As will be explained more fully, the content distribution path determination technique considers situations in which the root network and a non-root network group may or may not share common selected network groups as ancestors within the network topology. Based on this determination, the content distribution path determination technique includes various network groups within the distribution path from the root network group (i.e., from the root content engine in this network group) to a particular non-root network group.

The content distribution path determination technique disclosed herein does not consume extensive network resources and the distribution path formation techniques do not substantially interfere with content delivery. In addition, embodiments of the invention operate to define distribution paths that are efficient and can take into account such factors as relatively slow data communications links existing between content engines in different network groups as well as firewall conditions that may exist between network groups of content engines that might only allow one directional communication. In addition, the system of the invention can develop balanced distribution paths such that, for example, a particular selected ancestor network group is not required to distribute content to too many other "child" network groups of content engines, thereby unduly burdening this network group of content engines. Accordingly, the content distribution path determination techniques disclosed herein operate to form efficient content distribution paths from root content engine(s) to non-root content engines and the embodiments account for a myriad of conditions that may arise which can affect content pre-positioning efficiency.

FIG. 1 illustrates an example computing system environment 100 that includes a computerized device 110 that operates to determine a set of content distribution paths 325 within a network topology 320 in accordance with one example embodiment of the invention. The computerized device 110 can be any type of computer system, workstation, data communications device or other electronic device and includes an interconnection mechanism 111 such as a data bus and/or other circuitry that interconnects a memory 112, a processor 113 and one or more communications interfaces 114. By way of example, the computerized device may be a content provider computer system, content engine computer system, a content router computer system or any other type of computer system associated with or operating within a content distribution network. It is to be understood that computer systems not specifically used within content distribution networks can also be configured to perform the processing of this invention.

Within the computerized device 110, the memory 112 may be any type of volatile or non-volatile memory, computer readable medium, or other storage or memory system such as computer memory (e.g., random access memory (RAM), read-only memory (ROM), or other electronic memory), disk memory (e.g., hard disk, floppy disk, optical disk and so forth), or the like. The memory 112 is encoded with logic instructions (e.g., software code) and/or data that form a path manager application 120 configured according to embodiments of the invention. The path manager application 120 in this example embodiment is software code (e.g., object code or source code), logic instructions and/or data that embody the processing logic steps and operations as explained herein and that reside within the memory 112 or other computer readable medium accessible to the computerized device 110. In addition, in this example, the memory 112 is encoded with network configuration information 132 that includes, for example, data structures such as a representation of the network topology 320 and other information used for computation of content distribution paths 325, as will be explained.

The processor 113 represents any type of circuitry or processing device such as a central processing unit, controller, one or more microprocessors, programmable gate array(s) (e.g., FPGAs), application-specific integrated circuit(s) (ASICs) or the like that can access the path manager application 120 encoded within the memory 112 over the interconnection mechanism 111 in order to execute, run, interpret, operate or otherwise perform the path manager application 120 logic instructions. Doing so forms the path manager process 121. In other words, the path manager process 121 represents one or more portions of the logic instructions of the path manager application 120 while being executed or otherwise performed on, by, or in the processor 113 within the computerized device 110. The path manager process 121 includes some associated processing modules that in this example include an input selector 122, a path determiner 123, and a content director 124. Generally, these modules 122 through 124 collectively operate as explained herein to produce the set of distribution paths 325 that allow the computerized device 110 to receive and distribute content according to the distribution paths 325. During operation of the invention, the path manager process 121 (and its associated modules 122, 123 and 124) receive the network topology 320 and related information (to be explained) and can process this information (i.e., network configuration information 132 in the memory 112) as required to perform the operations explained herein that result in the production of the distribution paths 325 defined within the network topology.

One example network topology 320 is also illustrated in FIG. 1. Prior to explanation of the operation of embodiments of the invention, a brief review of the example network topology 320 and associated terminology will be given to assist in understanding operation of the invention. The network topology 320 represents a hierarchical interconnection of network groups 300-1 through 300-17 linked to each other as illustrated by data links 310 (only certain of which are enumerated due to space considerations in this figure). The network topology 320 in this example includes three hierarchical network group trees 302 through 304 that stem or originate from top-level or top tier network groups 300-1 through 300-3. The network topology 320 also includes an origin server 350 from which content 370 originates and is supplied to root network group(s) (i.e., 300-1 in this example, to be explained), which then in turn disseminate or distribute to other selected network groups (shown in bold in FIG. 1) according to the distribution paths 325 calculated according to embodiments of the invention.

Each network group 300 represents a collection of one or more interconnected content engine computer systems 354. By way of example, the network group 300-9 is illustrated in a detailed or expanded view and includes a network of interconnected content engines 354-1 through 354-5. These content engines 354 in the network group 309 represent, for example, a set of content engine computer systems such as web server computer systems within a local content distribution network facility such as one building of a corporate enterprise, one store or outlet, or one server hosting facility for a large web portal. A network group of content engines 354 may be, for example, a Local Area Network (LAN) of content engines 354 or may be a single content engine. It is to be understood that each network group 300-1 through 300-17 may contain a similar or a different interconnection of one or more content engine computer systems 354. For purposes of this explanation (though embodiments of the invention are not necessarily limited as such), it can be assumed that all content engines 354 within a single network group (e.g., 300) are "well-connected" respectively to one another. By well-connected, what is meant is that, for example, there are no firewalls existing between the interconnections of content engines 354 within a particular network group 300 and that each content engine 354 in a network group 300 can efficiently communicate with other content engines 354 in that same network group 300. The data link 312 that interconnects the upper most, top-tier or top-level network groups 300-1 through 300-3 in the hierarchical network topology indicates that each top level network group 300-1 through 300-3 can communicate with other top level network groups of other network topology trees 302 through 304 if required to do so. In other words, the network topology 320 may be a grouping of separate hierarchical network distribution trees 302 through 304 that can communicate with each other (e.g., via their top level network groups 3001-1, 300-2 and 300-3 in this example).

By expressing the network topology 320 as a hierarchical arrangement of distribution trees 302 through 304, each containing a hierarchy of network groups 300 that each in turn contain one or more content engines 354 proves to be useful for modeling networks used by embodiments of the invention since multi-server groups (i.e., network groups of content engines) occur naturally in many content distribution network systems. As an example, the content engines 354 in a particular network group 300 may be co-located in a data center or may be connected and linked with each other in a local area network configuration. In addition, some network groups 300 may be coupled to computer networks such as the Internet using high-speed data communications links 310 (e.g., T1 or fiber optic connections) while other network groups 300 (e.g., lower level network groups 300-4 through 300-18) may be coupled via slower data communications links or behind firewall data communications devices existing on or within a link 310 that only allow communication in one direction (e.g., out from a lower level network group 300-11, as opposed to allowing incoming communications into that lower level network group 300-11). In general then, in this example network topology 320, top tier or top-level network groups 300-1 through 300-2 are assumed to be interconnected with each other via high speed link 312 (e.g., an Internet backbone) to support high-speed communications while lower tier network groups such as network groups 300-11 through 300-17 couple to upper-level (i.e., middle tier) network groups 300-4 through 300-10 using potentially slower speed data communications links 310. The middle tier network groups 300-4 through 300-10 couple to top tier network groups 300-1 through 300-2 with preferably higher speed data communications links 310 as compared with the lower tier groups 300-11 through 300-17.

Embodiments of the invention take into account such bandwidth and firewall considerations and limitations and can develop or model a set of optimal distribution paths 325 within a network topology 320 as illustrated by way of example in FIG. 1. The content distribution path determination technique explained herein can, for example, arrange a distribution path 320 to allow a content engine in a network group such as 300-11 having with a relatively slow data communications link 310 to preferentially receive content from a better connected (i.e., faster or higher available bandwidth) network group 300-4 which may be considered a parent or ancestor network group of the slower connected network group 300-1 in the network topology 320.

As illustrated in FIG. 1, the computerized device 110 generally operates the path manager process 121 to receive the network topology 320 and to determine, based on other information received as will be explained, a set of optimal or ideal distribution paths 325 for content between "selected" content engines 354 within network groups 300 within the network topology 320. As will be explained in detail, once the path manager process 121 receives the network topology 320, a user (not specifically shown) or a process or program interacting with the path manager process 121 can select a set of specific content engines 354 within any of the various network groups 300. Each network group 300 that contains one or more of the selected content engines 354 is termed a "selected" network group and those network groups that have no selected content engines 354 are termed "non-selected" network groups for purposes of this explanation. Selection of content engines 354 within the network groups 300 defines a "channel definition" that indicates a collective set of selected content engines 354 that are to receive some content, and also therefore indicates a set of selected network groups (any group containing a selected content engine is a selected group) that are to be used for dissemination or distribution of this content over a content distribution network within the network topology 320.

In FIG. 1, examples of selected network groups are shown with bold line borders and in this example include network groups 300-1 through 300-4, 300-9 through 300-13, 300-15 and 300-16. The other groups 300-5 through 300-8, 300-14 and 300-17, each having non-bold border, are non-selected network groups in this example. In addition, and as will also be explained in more detail shortly, the path manager process 121 determines (e.g., via user selection or an automated process) an assignment of one or more root content engines 360 that serve as root network nodes to disseminate or otherwise distribute content 370 received from the origin server 350. The root content engine assignment 360 thus defines a root network group.

In the example in FIG. 1, a user selects a single root content engine 360 within the network group 300-1, thus making the network group 300-1 a "root" network group. After receiving a network topology 320 and a selection of content engines 354 within a channel definition and an assignment of a root content engine 360, the system of the invention can apply a content distribution path determination algorithm (e.g., via operation of the path determiner 123 in FIG. 1) to produce an ideal or optimal set of distribution paths 325 for distribution of content 370 from the root content engine 360 in the root content group 300-1 to each of the remaining non-root, but selected, network groups (i.e., network groups 300 containing one or more of the non-root selected content engines 354).

Details of this processing and associated operation are explained next with respect to the flow chart of processing steps shown in FIG. 2 and the remaining description of embodiments of the invention provided below.

Figure 2:
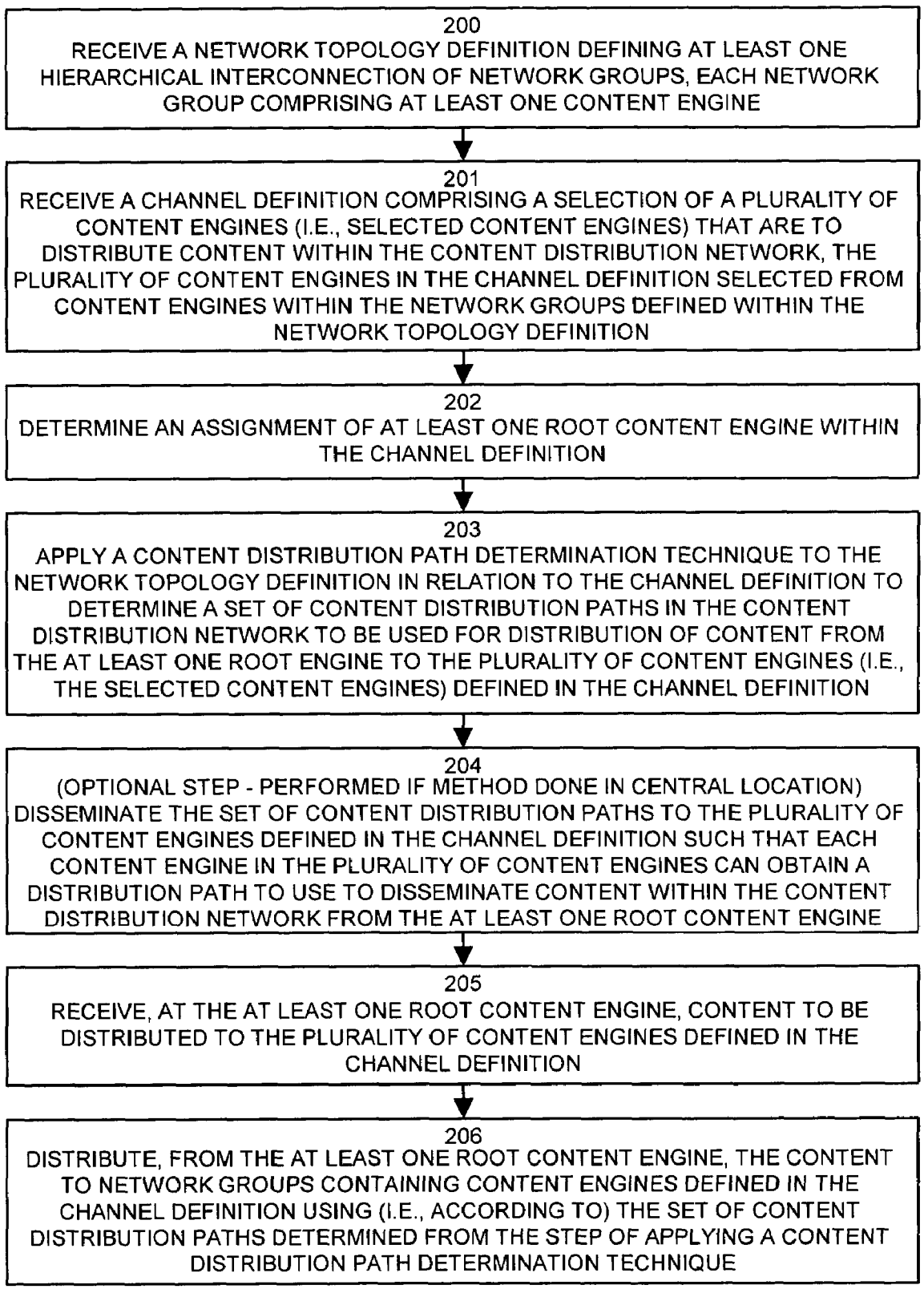
FIG. 2 is a flow chart of processing steps performed by a computerized device configured according to embodiments of the invention.

FIG. 2 is a flow chart of processing steps that illustrate operation of embodiments of a computerized device configured with a path manager application 120 and path manager process 121 in accordance with embodiments of the invention.

In step 200, the path manager process 121 (e.g., the input selector 122 in FIG. 1) receives a network topology definition 320 defining at least one hierarchical interconnection of network groups 300. Each network group 300 comprises at least one content engine 354. The path manager process 121 a receives the network topology definition 320, for example, directly from a user or from an input file or other input source located locally or remotely from the computerized device 110.

Next, in step 201, the path manager process 121 receives a channel definition comprising a selection of a plurality of content engines 354 that are to be used to distribute content 360 within a content distribution network (e.g., within the network topology 320). The content engines 354 within the channel definition are selected from content engines 354 within the network groups 300 defined within the network topology definition 320. As illustrated in FIG. 1, the detailed view of the example network group 300-10 includes two selected content engines 354-1 and 354-2 shown as solid black circles. The user has not selected any other content engines 354-3 through 354-5 in the network group and thus these are examples of non-selected content engines. Since the network group 300-10 includes a selection of content engines 354-1 and 354-2 as part of a selection of a channel definition in step 201, the network group 300-10 is a referred to herein as a "selected" network group (i.e., it contains one or more selected content engines 354).

In step 202 the path manager process 121 determines an assignment of at least one root content engine 360 within the channel definition (i.e., within the set of selected content engines 354 received as the channel definition in step 201). In step 202, the assignment of at least one root content engine 360 can be determined or received from the user that supplied the selection of content engines 354 or, alternatively the path manager process 121 can automate the selection or assignment of one or more root content engines 360. As an example of this automatic root content engine selection process, the path manager process 121 could, for example, select a content engine 354 within each top level selected network group 300-1 through 300-3 to serve as root content engine(s) 360. In the illustrated example, only one root content engine 360 has been assigned or selected within the entire network topology 320.

Next, in step 203, the path manager process 121 applies a content distribution path determination technique (e.g., implemented within the path determiner 123) to the network topology 320 in relation to the channel definition (i.e., across the entire set of selected content engines 354) in order to determine a set of content distribution paths 325 within the content distribution network (i.e., within the network topology 320) to be used for distribution of content 370 from the root content engine 360 to the plurality of content engines (i.e., selected content engines) defined in the channel definition. In other words, the path manager process 121 applies a content distribution path determination techniques to determine a set of data distribution paths 325 that indicate how content should be distributed from the root content engine 360 to each of selected network groups 300 containing selected content engines 354 (e.g., 354-1, 354-2 and the like).

The resultant set of data distribution paths 325 that step 203 produces for the example network topology 320 is illustrated in FIG. 1. The specific techniques that the path manager process 121 applies to determine how a particular set of selected content engines within one selected network group 300 is to receive content from another selected network group (i.e., details of a content distribution path determination technique) will be explained in more detail shortly. Once embodiments of the invention produce the set of content distribution paths 325, the distribution paths can be used for the dissemination of content 360 to each of the selected network groups 300 for dissemination within those groups to the respective selected content engines 354.

Step 204, which is an optional step, is performed if the processing operations and methods of embodiments of the invention are performed in a central location such as within a single computerized device 110. In step 204, the path manager process 121 disseminates the set of content distribution paths 325 to the plurality of selected content engines 354 defined in the channel definition such that each selected content engine 354 in the plurality of content engines can determine a distribution path 320 to use in order to disseminate content within the content distribution network from the root content engine(s) 360. In other words, in step 204, if the aforementioned processing steps 200 through 203 are performed in a single computerized device 110, then after determination of the set of distribution paths 325, this computerized device 110 can disseminate the content distribution path information 325 from this location to each of the selected content engines 354 within the network topology 320 such that each selected content engine 354 can be made aware of the content distribution paths 325 it is to use in disseminating content 370 within the content distribution network.

In an alternative embodiment of the invention, each content engine 354 can perform the processing steps 200 through 203 and thus there is not only one computerized device 110 that performs the steps and therefore each content engine 354 will be inherently in possession of (from the aforementioned processing operations) the set of content distribution paths 325 that the content engine 354 is to use for content distribution within the content distribution network. Is such an embodiment, step 204 need not be performed.

Next, in step 205, once the content distribution paths 325 within the network topology 320 are known to each content engine 354, embodiments of the invention allow the root content engine 360 to receive content 370 to be distributed to each of the selected content engines 354 defined within the channel definition. Once a root content engine 360 has received the content 370 to be distributed, processing can proceed to step 206.

In step 206, embodiments of the invention cause the root content engine 360 and all other selected content engines 354 in each of the selected network groups 300 to distribute, from the root content engine(s) 360, the content 370 to the network groups 300 containing selected content engines 354 defined in the channel definition using the set of content distribution paths 325 determined from the step of applying a content distribution path determination technique (i.e., step 203). In this manner, in step 206, each content engine 354 disseminates or distributes the content 370 according to (i.e., over) the data distribution paths 325 calculated as explained above.

Directing attention to the set of content distribution paths 325 shown in the illustrated example in FIG. 1, the arrowheads on the data links 320 indicate the direction of content distribution from the root network group 300-1 which contains the root content engine 360 to other network groups. In particular, the root network group 300-1 distributes content to four other network groups 300-2, 300-3 (the other two top tier or top level network groups), 300-4 (a mid-level group that is a child or direct descendant of the root network group 300-1) and a bottom level group 300-13. Once each of the network groups 300-2 through 300-4 receives the content 370 from the root network group 300-1, each of these groups in turn distributes this content again to child network groups of their own (in addition to caching the content locally for servicing client requests) along the distribution path until the last content engine in the last network group (i.e., the furthest from the root network group) has received the content 370. As such, the mid-level network group 300-4 below the root group 300-1 distributes the content 370 to the bottom tier network groups 300-11 and 300-12. The top-level network group 300-2 disseminates or distributes the content 370 directly to the bottom tier network group 300-15. Likewise, the top-level network group 300-3 disseminates the content 370 to the mid-level network groups 300-9 and 300-10. The mid-level network group 300-9 and further distributes the content 370 to a single bottom tier network group 300-16.

Note that in this example the content distribution path determination technique implemented by embodiments of the invention in step 203 does not include the non-selected network groups from the network topology 320 within the content distribution paths 325. In other words, these non-selected network groups 300-5 through 300-8 and 300-14 and 300-17 are "pruned" or otherwise ignored in content distribution since they contain no selected content engines 354 and thus do not participate in content distribution from selected root network groups and root content engines.

Figure 3:
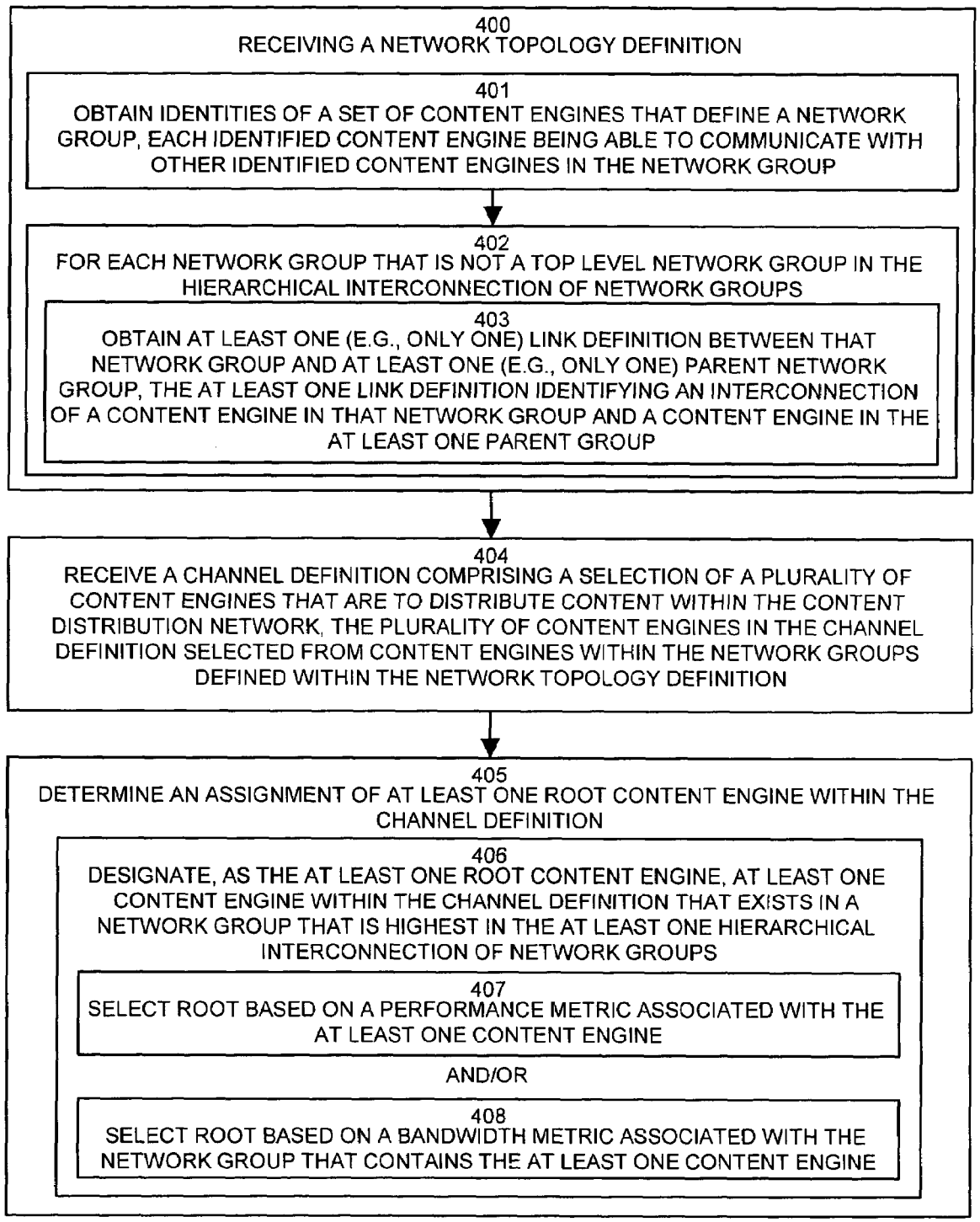
FIGS. 3 and 4 are a flow chart of processing steps that illustrate details of processing performed by a computerized device configured according to one embodiment of the invention.
Figure 4:
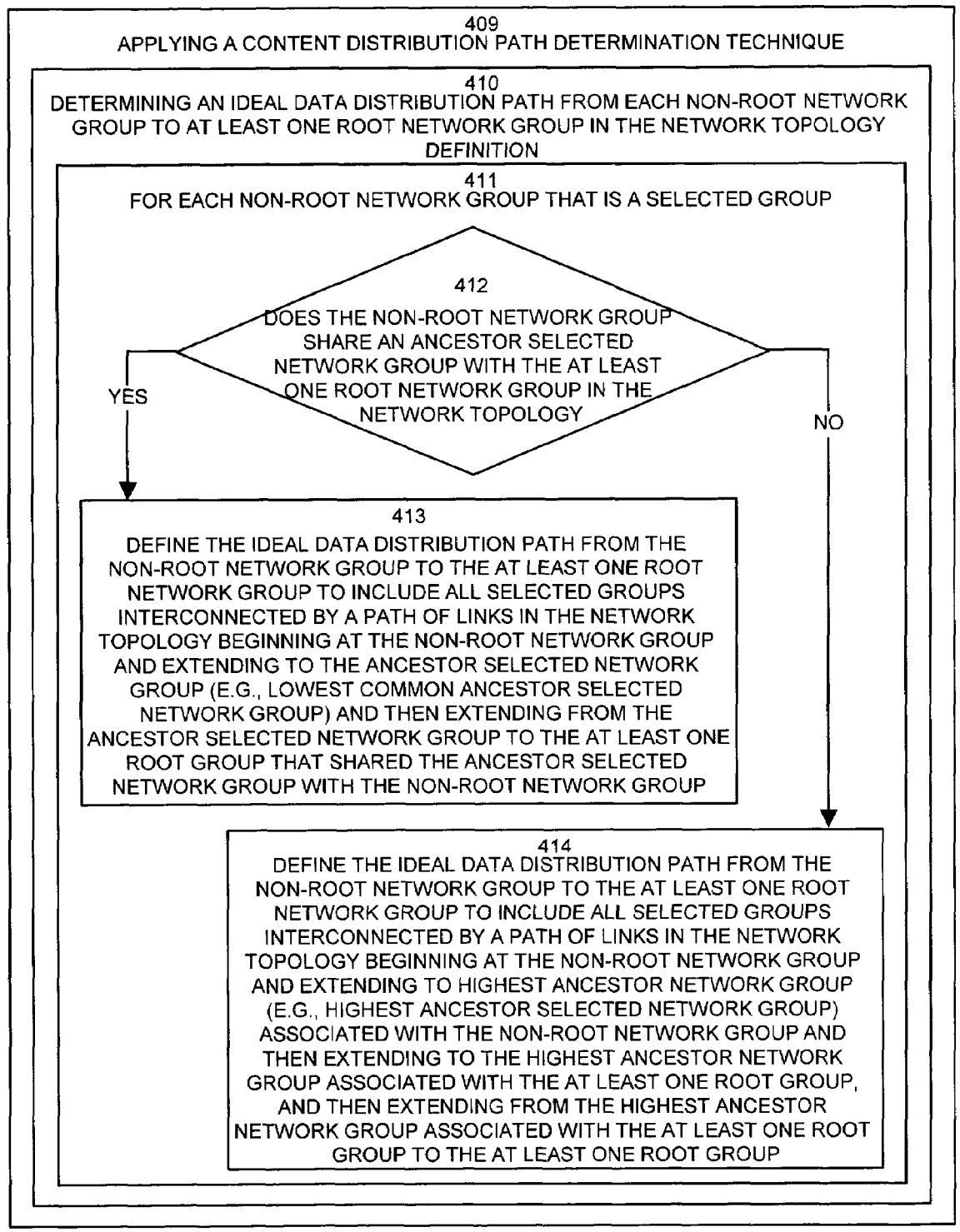

Further details of processing operations performed according to embodiments of the invention are illustrated with respect to processing steps in a flow chart shown in FIGS. 3 and 4. During discussion of the processing steps in the flow chart in FIGS. 3 and 4, reference will be made to the example networked topology 320 and example set of content data distribution paths 325 illustrated in FIG. 1.

In step 400, the path manager process 121 receives the network topology definition 320 as explained above with respect to step 200 in FIG. 2. Steps 401 through 403 in the flow chart in FIG. 3 illustrates details of one example embodiment which allows the path management process 121 to receive the network topology definition 320.

In step 401, the path manager process 121, and specifically in this example the input selector 122 in FIG. 1, obtains identities of a set of content engines 354 that define a network group 300. Each identified content engine 354 is able to communicate with other identified content engines 354 in the network group. As an example, during the network group definition process in step 401, content engines 354 within the network group are generally not considered to contain firewalls in between the content engines 354. A user or configuration file can be used to provide the identities of all content engines 354.

Next, in step 402, a processing loop is performed for each network group that is not a top-level network group in the hierarchical interconnection of network groups defined within the network topology 320. As an example with respect to the network topology 320 illustrated in FIG. 1, the processing loop defined by step 402 is performed for network groups 300-4 through 300-17 since each of these network groups is not a top-level network group (the top level network groups being network groups 300-1 through 300-3) in a hierarchical network topology 320.

In step 403 which is performed for each network group that is not a top-level network group in the hierarchical interconnection of network groups that define the network topology 320, the path manager process 121 obtains at least one link definition 310 (i.e., a network path, route or communications channel) between that network group 300 and at least one parent (i.e., ancestor) network group 300. In a preferred embodiment of the invention, there is a single link from each child group to an upper level or parent group such that the wording "at least one link definition" is only one link definition between that network group and only one parent or ancestor network group. It is to be understood that while the network definition in the preferred embodiment network contains a set of disjoint trees (i.e., in which each group node has at most one link connecting to a parent node), other alternative embodiments can include more than one parent, but subsequent computations to determine distribution trees as explained herein may become computationally expensive in such embodiments (i.e., in which groups have more than one parent).

The link definition 310 identifies an interconnection (e.g., a network of one of more links or hops) of a content engine 354 in that network group 300 and a content engine in the parent network group 300. This does not means that the content engine 354 of one group must be directly connected to a content engine of another group, but rather, by "link definition" and "interconnection", what is meant is that there is some communications path over a network such as the Internet such that one group is coupled to another group over a network (of one or more network hops or links) such that any content engine in, for example, a child network group can use this interconnection network (of at least one link definition) to communication with any content engine of a parent group. This allows any content engine, for example in a child network group, to communicate with any content engine in the parent network group.

In addition, links can be annotated with extra information identifying, for example, a bi-directional or uni-directional communications capability indicating whether a link has an associated firewall on its path between network groups. If the link has a firewall it means the child network group is behind a firewall relative to the parent network group.

Also, during obtaining the link definition in step 403, embodiments of the invention can perform checking of the network topology to ensure, for example, that there are no cycles in which a group could be an ancestor of itself.

During the iterative processing that takes place in step 403 (i.e., in the loop defined by step 402), the path manager process 121 obtains parent-child link definitions 310 between network groups 300 that are not top level network groups such that each network group 300 has a parent network group (i.e., a network group higher in the hierarchy in relation to the level of the network group for which this iteration of the loop defined by step 402 is being performed). In this manner, the processing steps 401 through 403 allow the path manager process 121 to develop a hierarchical interconnection of network groups 300, with each network group 300 comprising an interconnected set of one or more content engines 354. Note that the link definitions 310 may be specified in a configuration file along with each content engine in the network topology 320. This configuration file can also specify, for example, firewall conditions that indicate the existence of firewalls somewhere in the link or interconnection path between network groups that impedes communications, for example in one direction or the other.

Next, in step 404, the path manager process 121 receives the channel definition comprising a selection of a plurality of content engines (e.g., the selected content engines 354-1 and 354-2 and any other selected content engines in other network groups 300) that are to distribute content 370 within the content distribution network defined by the network topology 320. The content engines in the channel definition are selected (e.g., by a user or specified in a channel definition file) from all available content engines (i.e., received as part of the network topology in step 401) within the network groups 300 defined within the network topology definition 320. The processing of step 404 in the example embodiment is similar to that in step 201 in FIG. 2.

Next, in step 405 the path manager process 121 determines an assignment of at least one root content engine 360 within the channel definition (i.e., within the selection of selected content engines 354). In this example embodiment of the invention, the path manager process 121 performs steps 406 and sub-steps 407 and/or 408 in order to determine the assignment of one or more root content engines 360 within the selection of selected content engines 354 that define the channel definition within the network topology 320.

In particular, in step 406, the path manager process 121 designates, as a root content engine 360, at least one selected content engine 354 (i.e., one within the channel definition) that exists within a network group 300 (i.e., a selected network group since the route content engine is selected from the content engines defining the channel definition) that is highest in the hierarchical interconnection of network groups that form the network topology 320. In other words, in step 406, the path manager process 121 is able to automatically determine an assignment of a root content engine 360 from the collective set of selected content engines 354 that exist within any selected network groups 300 by choosing a network group(s) that exists at the highest level in the hierarchy of network groups 300 in the network topology 320. In the example illustrated in FIG. 1, the network group 300-1 contains the selected content engine 354 that is assigned to be the root content engine 360. It is to be understood that the path manager process 121 may perform assignment of a root content engine 360 in this automated manner or many others or allow a user to select the root network group 300-1. Thus a user interacting with the path manager process 121 may manually perform selection of one or more specific selected content engines 354 to serve as root content engines 360.

Sub-steps 407 and 408 indicate example of various metrics that the path manager process 121 may use when automatically considering (or in assisting the user in considering) selection of one or more selected content engines 354 to serve or operate as root content engine(s) 360. In particular, in sub-step 407, the path manager process 121 may consider a performance metric associated with a content engine 354 (e.g., how fast the processors are in the server) when determining if a content engine should be assigned as a root content engine 360. In sub-step 408, the path manager process 121 may consider a bandwidth metric (e.g., the bandwidth or speed or load of a network connection that a content engine 354 has into the network 320) associated with the network group 300 that contains a particular selected content engine 354 in order to determine if that content engine 354 should serve as a root content engine 360. In this manner, the path manager process 121 can consider various factors in providing an optimal selection of one or more root content engines 360.

Once the at least one root content engine 360 has been determined and the selection of content engines 354 that comprise the channel definition is complete (step 404), processing can proceed to the top of FIG. 4 beginning at step 409 to in order to apply a content distribution path determination technique.

Directing attention now to the top of the flow chart in FIG. 4, in this example embodiment of the invention, the path manager process 121 applies a content distribution path determination technique in step 409 by performing sub-steps 410 through 414 in order to determine the set of content distribution network paths 325 based on the information received or determined in steps 400 through 408.

In particular, in step 410 the path manager process 121 determines an ideal data distribution path 320 from each non-root network group 300 to at least one root network group 360 within the network topology definition 320. Directing attention back to the example network topology 320 illustrated in FIG. 1, in step 410, the path manager processes sub-steps 411 through 414 generally to determine an ideal data distribution path for each non-root selected network group 300-2 through 300-4, 300-9 through 300-13 and 300-15 through 300-16 (i.e., the selected network groups) to allow those non-root selected network groups to establish a data distribution path back to the selected root network group 300-1 containing the selected root content engine 360 in order to obtain content 370 from the root network group 360. To determine these ideal data distribution paths 320, as illustrated in the set of distribution paths 325 at the bottom of FIG. 1, the content manager process 121 develops a distribution path or data link 320 from each non-root network group 300 back to the selected route network group(s) 360. Note that if more than one root network group 360 exists (i.e., is assigned in step 405), the processing illustrated in FIG. 4 (i.e., steps 410 through 414) can be done for each non-root network group 300 in relation to each root-network group containing a root content engine 360. Thus steps 410 and its associated sub-steps 411 through 414 can be done for a first root network group, then a second (if any), a third and so forth.

In particular, in step 411, the path manager process 121 enters a processing loop that is performed for each non-root network group that is a selected network group. In other words, the path manager process 121 processes the processing loop defined by step 411 for each non-root network group 300 in the entire set of selected network groups to allow a content distribution path 320 to be created from that non-root network group 300 back to the one or more of the root network groups (e.g., only one, 300-1, in the example in FIG. 1) containing a selected root content engine 360. The process of choosing a network path between a non-root network group and a root network group relates to determining ancestry relationships within the networked topology for each of the selected groups 300, as will be explained next.

In step 412, upon selection of a non-root network group 300 that is a selected group (i.e., one of the non-root selected groups 300-4, 300-9 through 300-13, 300-15 or 300-16), the path manager process 121 determines if that non-root network group 300 shares an ancestor selected network group 300 with the root network group (e.g., 300-1) in the networked topology 320. By "ancestor" of the selected network group 300, what is meant is a selected network group above the current selected network group (i.e., the network group being processed in this iteration of step 411) in the distribution tree (e.g., 302) containing the current selected network group. This ancestor may be the root or the non-root group itself. Accordingly, in step 412, the path manager process 121 determines if it shares an ancestor selected network group (which may include the root or the non-root network group 300-1 itself) with the root network group in the networked topology 320. Generally, the processing of step 412 determines if the non-root network group 300 currently being processed in this iteration of step 411 is within the same hierarchical tree 302, 303 or 304 as the root network group 300-1. In one embodiment of the invention, the ancestor selected network group is the lowest common ancestor selected network group and thus if the non-root network group and the root-network group shared multiple ancestor selected network groups within a distribution tree, the lowest common ancestor would be selected. If so, processing proceeds to step 413.

As an example of the processing decisions made in step 412, directing attention to the example networked topology 320 illustrated FIG. 1, if the processing loop defined by step 411 were being processed, for example, for the selected network group 300-11 in the distribution tree 302, the path manager process 121 determines if there is a selected ancestor network group, which is defined as any selected network group located at any position above the current selected network group within the hierarchical networked topology 320 (i.e., 300-4 or 300-1 are ancestors to 300-11), that is a shared ancestor of the selected network group with the root network group. In the example networked topology 320 in FIG. 1, since the root network group 300-1 is the top of the distribution tree 302, and since this root network group 300-1 is an ancestor of the non-root selected network group 300-11, then the answer to the determination in step 412 is YES, that the non-root selected network group 300-11 does share an ancestor selected network group with the root network group, that being the root network group 300-1 itself.

As another example of the determination made in step 412, consider the same determination for a current selected non-root network group 300-16 in the distribution tree 304 in the example hierarchical networked topology 320 illustrated in FIG. 1. For the non-root network group 300-16, its ancestor selected network groups in the distribution tree 304 are the mid-level selected network group 300-9, as well as the top-level or top-tier selected network group 300-3. As such, the non-root selected network group 300-16 does NOT share a common ancestor with the root network group 300-1 and step 412 processing proceeds to step 414 in such a case.

It is to be understood that various tree-walking algorithms can be used in embodiments of the invention to traverse the network topology to find ancestor nodes, top-level nodes, and the like. As an example, various N-ary tree manipulation and traversal algorithms that use prefix, postfix and infix tree walking techniques could be utilized by the invention to traverse the network topology and or distribution tree(s) associated with selected nodes in order to determine, for example, if non-root and root network groups shared a common ancestor network group.

For purposes of this discussion, returning attention to processing performed for the current selected low-level network group 300-11, processing proceeds from step 412 to step 413.

In step 413, the path manager process 121 defines an ideal data distribution path 320 from the current non-root selected network group 300-11 to the root network group 300-1 to include all "selected" network groups interconnected by a path of data links 310 in the networked topology 320 beginning at the non-root network group 300-11 and extending to the ancestor selected network group which in this case is the root network group 300-1 itself. At this point in processing for the selected network group 300-11, processing of step 413 is complete since a path has been determined to the root network group 300-1. However, depending upon other possible selections of network groups 300, the processing can continue to develop the data distribution path by extending the path from the ancestor selected network group to the root network group that shared a common ancestor selected network group with the non-root network group in a particular distribution tree.

An example will illustrate the processing logic of step 413. Directing attention to the networked topology 320 illustrated in FIG. 1, consider a situation in which the user of the path manager process 121 decides to select, as a root content engine, the content engine 354-1 within the selected network group 300-10. In this case, the network group 300-10 becomes a root network group. Now continuing with this example, consider that the processing of the loop defined by step 411 is occurring for the network group 300-16. In such an example scenario, in step 412, the path manager process 121 determines if the non-root network group 300-16 shares an ancestor selected network group with the root network group 300-10. Using the aforementioned scenario, the answer to the question in step 412 is YES, because the selected network group 300-3 (which happens to be a top-level network group in this example) is a common ancestor in the distribution tree 304 between the non-root selected network group 300-16 and the root network group 300-10. Accordingly, as in the previous example, processing proceeds to step 413 because the non-root network group and the root-network group share a common selected network group ancestor in the networked topology 320.

Continuing with this example, in step 413, the path manager process 121 is able to define an ideal data distribution path (i.e., a set of links 320) between the non-root network group 300-16 and the root network group 300-10 by including all selected network groups interconnected by a path of data links 310 within the network topology 320 beginning at the non-root network group 300-16 and initially extending to the common ancestor selected network group 300-3. In one embodiment of the invention, the ancestor selected network group is the lowest common ancestor selected network group and thus if the non-root network group and the root-network group shared multiple ancestor selected network groups within a distribution tree, the lowest common ancestor would be selected in step 413. Accordingly, at this point in processing of step 413, the network path for distribution of content extends from the non-root network group 300-16 to the non-root selected network group 300-9 and then continues to the non-root but common ancestor selected network group 300-3. Then continuing further with the processing logic in step 413, the distribution path 320 between these nodes then extends from the ancestor selected network group 300-3 group to the root network group 300-10 (and would include any selected network groups in between). In this manner, the distribution path of network groups for content from the root network group 300-10 to the non-root network group 300-16 appears as follows: 300-10 to 300-3 to 300-9 to 300-16.

Returning attention now to the processing logic decision made in step 412, if the particular current non-root network group being processed in this iteration of step 411 does not share a common ancestor selected network group with the root network group, processing proceeds to step 414. An example of this scenario exists in FIG. 1 if the root network group is 300-1 and the loop in step 411 is being processed for any of the selected non-root network groups in any of the distribution trees 303 and 304. As a specific example, consider again the scenario in which the path manager process 121 is processing step 411 for the non-root selected network group 300-16 and where the root network group is 300-1. Since neither of these network groups 300-1 and 300-16 share a common ancestor selected network group, processing proceeds to step 414.

In step 414 (whose operation will be discussed in relation to the most recent example using non-network group 300-16 and root network group 300-1) the path manager process 121 defines the ideal data distribution path 320 from the non-root selected network group 300-16 to the root network group 300-1 to include all selected network groups interconnected by a path of data links 310 in the networked topology 320 beginning at the non-root network group 300-16 and extending to the highest ancestor selected network group associated with the non-root network group 300-16. Using the aforementioned example, for the non-root network group 300-16, the highest ancestor selected network group (i.e., ancestor to the current selected non-root group) is the top-level network group 300-3. Continuing with the processing logic of step 414, the path then extends to the highest ancestor network group associated with the root network group 300-1, which in this example is the root group 300-1 itself, and as such processing of step 414 is complete for this example.

If, for example, the root group was a lower-level group within the distribution tree 302, such as one of the selected groups 300-4 or 300-11 through 300-13, the processing of step 414 would continue and extend the path from the highest ancestor selected network group 300-1 associated with the root group (e.g., wherein the root network group is 300-11 in this example), to the root network group 300-11 (and would include any selected network groups in between). In other words, the processing of step 414 covers situations in which a root network group exists within a distribution tree 302 through 304 within the networked topology 320 that is different than the distribution tree 302 through 304 of a selected network group 300 for which the processing of step 411 is being performed.

Another example of the processing of step 414 will further illustrate the aforementioned content distribution path determination technique. Suppose for this example that the root network group is the selected network group 300-10. Further suppose that processing of this iteration of step 411 is being performed for the selected network group 300-11. In step 412, processing for this example scenario proceeds to step 414 since the root network group 300-10 and the current selected non-root network group 300-1 (for which this iteration of processing is being performed) do not share a common ancestor selected network group in the network topology 320 (i.e., they are in different distribution trees 302 and 304). As a result, in step 414, the path manager process 121 defines the ideal data distribution path 320 to include all selected network groups 300-11, 300-4 and 300-1 that exist on the path of data links 310 between the non-root selected network group 300-11 and the highest ancestor network group 300-1 associated with this non-root network group 300-11. As indicated in parentheses in step 414, in one embodiment of the invention, the highest ancestor network group is the highest ancestor "selected" network group that in this example is still the network group 300-1. The data distribution path determined up to this point in processing is the network path that extends from the selected non-root network group 300-11 to group 300-4 and then to group 300-1. Since the root group 300-10 has not been reached, yet, processing of step 414 continues. Continuing with the processing in step 414, the path then extends from the highest ancestor network group 300-1 associated with the non-root network group 300-11 to the highest selected ancestor network group 300-3 associated with the root group 300-10. Note that the highest ancestor network group of the root group 300-10 is the group 300-3 which is a "selected group." In one embodiment of step 414, the path between two distribution trees is only between the highest "selected" ancestor groups of the root and non-root groups. If in the example in FIG. 1 the network group 300-3 had not been selected (i.e., did not contain any content engines 354 in the channel definition), then the path from the selected network group 300-1 would extend to the root network group 300-10 itself, since there is no higher network group in the root group distribution tree 304 that is "higher" and that is "selected" in the network hierarchy of the network topology 320.

Continuing with the above example of the path including the selected highest ancestor network group 303-3, the processing path then extends from this network group (i.e., the highest ancestor selected network group 300-3 associated with the root group 300-10) to the root network group 300-10 itself and includes any selected network groups in between those two network groups (none others in this example). Accordingly, using the aforementioned example scenario, embodiments of the invention have created a data distribution path 325 (a series of individual links 320 between selected nodes) that extends from the root network group's top-level selected ancestor network group 300-3 to the root network group 300-10 and the path determination process is complete for the non-root selected network group 300-11. Accordingly, the final content distribution path 320 for the non-root selected network group 300-11 to the root network group 300-10 appears as follows: 300-10 to 300-3 to 300-1 to 300-4 to 300-11.

Note that in the aforementioned examples, the root network group(s) distributes the content 370 along the path 320 in the reverse direction from which the path was formed. In other words, the origin server 360 provides the content 370 to each root network group and then the paths 325 from that root network group 300 to each non-root selected network group (computed as a result of processing steps 411 through 414) is then used to distribute the content 370 to each of those non-root selected network groups. In this manner, embodiments of the invention operate to develop content distribution paths 320 from root network groups to non-root network groups such that the selected content engines in these non-root network groups receive their content in an efficient manner.

Figure 5:
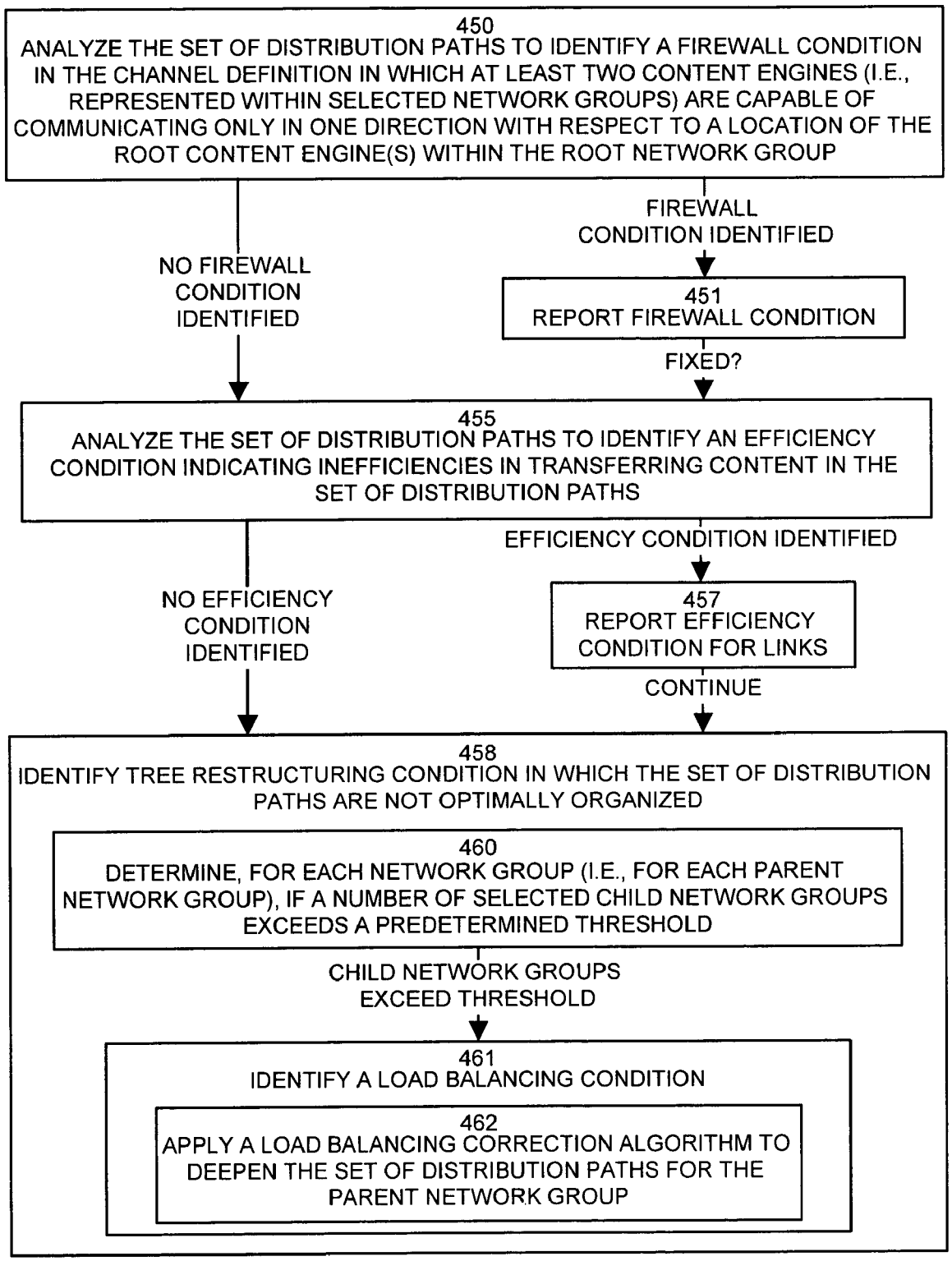
FIG. 5 is a flow chart illustrating processing performed by embodiments of the invention to detect firewall and load balancing conditions within a set of distribution paths in a network topology.

FIG. 5 is a flow chart of processing steps that the path manager process 121 can perform after completion of determination of the ideal data distribution paths 325 for each non-root selected network group to one or more of the root network groups in the networked topology definition 320. In particular, the flow chart of processing steps in FIG. 5 includes processing steps 450 and 451 (and related substeps), each of which performs a post-path determination analysis of the network paths computed by the processing steps in FIGS. 3 and 4 in order to determine if certain conditions exist which may make those paths less desirable. Such conditions can include, in this example embodiment of the invention, a firewall condition, an efficiency condition and a local balancing condition.

In step 450, the path manager process can determine a firewall condition of the set of distribution paths to determine is the distribution paths are subject to firewall constraints that can determine whether data can move as it ought to over the selected paths or links. Depending on where root and non-root network groups exist in the system and on the links that interconnect such groups, during operation data will either be "pushed" from the root to a non-root content engine in a non-root group (i.e., the root will send messages to its descendant in the path), or data will be "pulled" by a non-root content engine by sending data request messages to its ancestor group in the path. There may be a preferred direction and this might be the only direction allowed. The firewall condition can indicate when data transfer will not work in the preferred direction because the messages that need to be sent would be going the wrong way through the firewall during operation and would not be allowed to pass over the firewall link. For example, suppose a non-root content engine is behind a firewall relative to the root content engine in the root network group. In such cases, data pull would work to allow that non-root content engine to obtain the data from the root, but data push from the root would not work due to the existence and blocking configuration of the firewall.

As an example with respect to FIG. 1 and the path from groups 300-15 to 300-2, suppose group 300-15 is behind a firewall relative to group 300-2. This may be the case because the link from 300-15 to 300-7 is marked or annotated as a firewall (i.e., during receipt of the network topology in step 403, as explained above), or because the link from 300-7 to 300-2 is marked as a firewall, or both may have been annotated as containing firewalls. This means that content engines in group 300-2 will not be able to send data request (e.g., connection establishment) messages to content engines in group 300-15. Therefore, if group 300-2 is the root group, there will be a problem with data push, but if 300-15 is the root group, there will be a problem with data pull.

In particular, in step 450, the path manager process can analyze the set of distribution paths in order to detect or identify a firewall condition in the networked topology 320 (i.e., in the channel definition of selected content engines 354) in which at least two content engines within selected network groups 300 are capable of communicating (i.e., over a link 310) in only one direction with respect to the location of the root content engine (within a root network group) within the set of distribution paths. In other words, processing step 450 determines if the data distribution paths 325 allow data to only flow in one direction due to the existence of a firewall along the data distribution path 410. Generally, the firewall condition indicates whether the content can move over the selected data distribution paths in a restricted manner. Depending on the firewall condition, content or data will be either pushed from the root to a content engine (i.e., the root content engine will send content messages to a descendant network group content engine over the path) or data or content will be "pulled" by the content engine (i.e., the content engine will send messages to its ancestor node, that may be the root node, in the data distribution path). The firewall condition then indicates when data transfer in one of these directions will or will not work properly because the messaging used to transfer or distribute content through the distribution paths between network groups of content engines is subject to a firewall condition. As an example, is a content engine is behind a firewall relative to the root content engine, then the content engine can effectively "pull" data from the root, but "push" will not work from the root to the descendent content engine.

Based on the existence of firewalls, the distribution system might have a preferred way of transferring data, such as by pulling the data from upper level content engines to lower level content engines in the hierarchical set of distribution paths. When a firewall condition is not satisfied for some data distribution path, that data access mechanism (e.g., pull or push) will not work properly for at least part of that distribution path. This may mean that the path may not work at all, or alternatively it might mean that the system can use a different data transfer mechanism (e.g., push instead of pull over that part of the distribution path) to achieve the desired data distribution outcome.

In one embodiment of step 450, if a firewall condition is detected, then this step proceeds to step 451 to report a firewall condition that determines that communication between a content engine is capable only in a direction that is opposite of a direction required for distribution of content from the root content engine. In such cases, if the direction of data flow over a link 310 is allowed only in a direction and that direction is towards a root network group, the processing in step 451 indicates to the user of the path manager process 121 that a firewall condition may exist and that a content engine in a child network group must "pull" the data from the root, as opposed to the root having to push that data or content to the child content engine in a network group over the link subject to the firewall condition. Accordingly, in step 451, when the firewall condition exists for some path or link 310 (i.e., that path or link contains a firewall), the system can, for example, annotate a link 310 so that when the system is in operation to distribute content, the system causes that link to switch to using the other technique (e.g., push instead of pull) for the part of the path or link 310 that is affected. Otherwise the path 310 will not work at all for data distribution. In this case, processing in step 451 can report that the path does not work (i.e., report to the administrator). One solution to this problem may be to add a root or move the root. Assuming the firewall condition is fixed (either automatically by annotating a link with a specific use of a push or pull technique where needed to allow content to be distributed through a firewall, or via addition of nodes and reprocessing of operations from steps 400 to 450 again using addition selected groups), processing proceeds to step 455.

In step 455, the path manager process 121 analyzes the set of distribution paths to identify an efficiency condition indicating inefficiencies in transferring content in the set of distribution paths. As an example, if during the creation of the set of distribution paths, group nodes were removed from a path in the network topology and due to tier removal, inefficient distribution of data results, then an efficiency condition exists that should be remedied. As a general example, if the non-root CE and the root CE are in different trees, and if the top group nodes in these trees are not selected in the network topology, then data transfer can be inefficient since the top level nodes are typically interconnected via high speed communications links. Generally, the operator can improve efficiency by selecting more groups.

As an example with respect to FIG. 1, suppose that top level group 300-2 was not selected in step 404. Then the path from group node 300-15 to root group node 300-1 might not be good since communications to or from group node 300-15 that do not take place through group 300-2 are relatively slow (or expensive). Such situations can be identified in step 455, and if so, processing proceeds to step 457.

As another example, suppose the root group in FIG. 1 was group 300-4 and neither groups 300-1 nor 300-2 were selected in step 404 in FIG. 3. In such a case, group 300-15 would have to communicate directly with group 300-4 (or via some other communications path that does not pass through path 312) and thus this alternate path may be comparatively slow or expensive to operate. In such a case, the path manager process 455 can detect that a top level node, such as group node 300-2 in this example, should be included in the set of distribution paths 325 since including it will significantly improve efficiency.

In step 457, in the case of detecting an efficiency condition (i.e., an inefficient condition in the current set of paths based on the selected groups) the path manager process 121 in step 457 and can report that the path or link 310 having this efficiency condition might cause problems and can identify that a solution can be to select another node in step 404 to be included in the channel definition to receive that content (e.g., select 300-1 and 300-2 in the above examples).

Next, in step 460, the path manager process 121 identifies a tree-restructuring condition in which the set of distribution paths are not optimally organized. For example, suppose the top-level groups 300-1, 300-2 and 300-3 are in the London, New York City and Paris. Further suppose that the New York City group 300-2 is the root, and the paths have both London and Paris connected to the US. There isn't any load balancing problem here, but the path manager process 121 can still reorganize the tree to avoid having the content distribution crossing the Atlantic ocean more than once. So in step 460, the path manager process 121 can apply various network tracing algorithms that can consider a parent group with its children groups and can recognize a need to modify the set of distribution paths or trees. Accordingly, a tree restructuring condition is meant to be general and could happen, for example, because a parent group has too many child groups, or it might happen if the parent group and some of its children are top level groups, and so forth. Those skilled in the art of network optimization and configuration will understanding that there are many circumstances in which tree balancing techniques can be applied to the system of the invention in step 460 to produce a tree that optimally distributes data and takes into account such characteristics as relative slowness or expense of certain links between nodes, and the like.

Step 461 provides an example of one type of tree restructuring in which a parent network group has too many child network groups and thus the tree is unbalanced. It is to be understood that load balancing (i.e., child balancing) is one example of a tree restructuring algorithm applied when a tree restructuring condition is identified. Other tree restructuring algorithms besides load balancing could be applied as well to cover other scenarios, such as the example given above of not requiring data to be distributed twice over relatively expensive links.

In particular, regarding one example load balancing technique, in step 461, the path manager process 121 determines, for each selected network group, if a number of selected child network groups (i.e., those that depend from that selected group in the hierarchy) for that selected network group exceeds a predetermined threshold. As such, the processing of step 460 determines if a particular selected network group has too many data distribution paths (i.e., tree fan out) passing through, or originating from, itself for which that network group must distribute content 370. If the number of these paths or in other words, if the number of selected network groups that receive their content from this particular selected network group exceeds a predetermined threshold, then it is determined that there may be too many child selected network groups receiving their content from this particular selected network group and processing proceeds to step 461.

In step 461, the path manager process 121 signals a load balancing condition indicating that a particular network group is serving an excessive amount of child network groups during the distribution of content within the content distribution networked topology. An operator of the content distribution network can then take appropriate steps to mitigate these conditions, such as by designating more root network groups. It is to be understood that the processing steps shown in FIG. 5 could be performed prior to operation of the content distribution path determination technique such that firewall conditions and excessive load balancing conditions placed on parent network groups could be discovered before mapping out the distribution paths as explained herein.

In one embodiment of the invention, in addition to identifying a load balancing condition, processing can include step 462 in which the path manager process 121 applies a load balancing correction algorithm to deepen the set of distribution paths for the parent network group. Generally, this load balancing correction algorithm reassigns children of the parent network group using, for example, a tree balancing algorithm.

In an alternative embodiment of the invention, a generic load balancing algorithm is applied to the set of distribution paths for each network group in the set, regardless of how many or how few children each node has, thus balancing each node in the tree with respect to other nodes.

Figure 6:
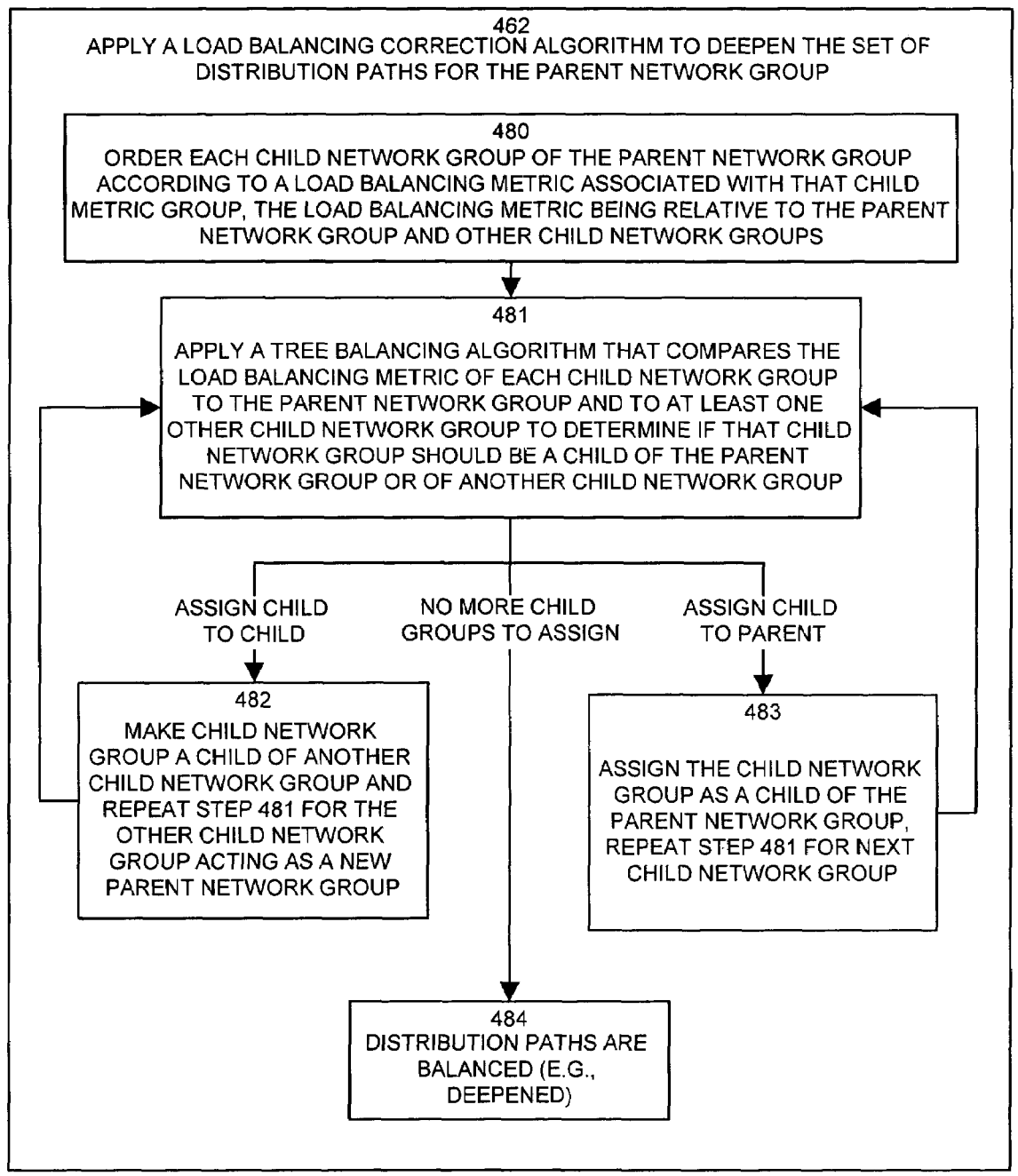
FIG. 6 is a flow chart that shows processing steps performed according to one embodiment of the invention to apply a load balancing correction algorithm to deepen a set of distribution paths created according to embodiments of the invention.

FIG. 6 is a flow chart of one example embodiment of the invention that performs processing operations to apply a load balancing correction algorithm to deepen a set of distribution paths (i.e., to reassign child network groups) for a particular selected parent network group that was determined, in step 460, to have too many selected child network groups. It is to be understood that this processing in FIG. 6 is shown by way of example only, and that other techniques could be applied to balance a set of distribution paths in situations where a parent group has numerous child groups.

In step 480, the path manager process 121 orders each selected child network group of the parent network group in the set of distribution paths 325 according to a load balancing metric associated with that child network group. The load balancing metric in this example embodiment is relative to the parent network group and other child network groups of the parent network group. An example of the load balancing metric for a child network group is a distance metric that reflects or indicates a time required to access data between the child network group and the parent network group, and between the child network group and other child network groups. This may be, for example, a round trip or "ping" time between content engines in the parent and child groups. Accordingly, if the load balancing metric is network distance, the path manager process 121 orders each child network group according to the network distance metric from the parent network group.

Next, in step 481, using the ordered child network groups (e.g., processing the groups closest in number to the parent first), the path manager process 121 applies a tree balancing technique that compares the load balancing metric of each child network group to the parent network group and to at least one other child network group to determine if that child network group should be a child of the parent network group or a if it should be a child of another child network group. In other words, in step 481, the path manager process 121 analyzes the load balancing metric such as network distance between the child group and the parent group and between the child group and other child groups. Note that if in step 481, if a parent group has no child group, that the group under consideration becomes a child of the parent group.

In one embodiment of the invention, if the load balancing metric in step 481 is less favorable between the child network group and the parent network group but is more favorable between the child network group and another child network group (i.e., isn't sufficiently less favorable), then that means that the child network group can access data more quickly from the other child network group and processing proceeds to step 482 to assign that child group as a child of that other child network group.

In step 482, the path manager process 121 assigns the child network group to be a child of the other child network group of the original parent (i.e., the child become s a grandchild group of the original parent) and repeats the processing of step 481 for the other child network group acting as a new parent network group. In this manner, processing proceeds from step 482 back to step 481 in a recursive manner in which the child network group to which another child was assigned as a grandchild now operates as a parent network group with respect to application of the tree balancing algorithm in step 481.

Returning attention now back to step 481, if the load balancing metric such as a shorter network distance is more preferable to the parent network group, then the path manager process proceeds to step 483 in order to assign that child network group as a child of the parent network group. In other words, in step 481, if the tree balancing algorithm then compares the load balancing metric of the child network group to a parent network group and determines that this load balancing metric is preferable to the comparison of the child network group to other child network groups, then the child network group remains assigned as a child to the parent group and processing proceeds to step 483.

In step 483, the path manager process 121 assigns (i.e., keeps assigned) the child network group as a child of the parent network group and repeats or returns processing to step 481 for the next child network group in the ordered set of child network groups of the parent network group. In this manner, the iterative processing of steps 481 through 483 apply the tree balancing algorithm which causes child network groups of a parent network group to be placed as children network groups of other child network groups that have more preferable load balancing metrics with respect to the parent network group. This processing allows a parent group with many children (i.e., a flat or bushy tree) to have some child network groups placed or reassigned as grandchildren network groups in relation to that parent group such that the parent network group only needs to distribute content along distribution paths to the remaining child network groups which have a favorable load balancing metric in comparison to the parent network group. Embodiments of the invention can use a specific delta value as a threshold to determine when the load balancing is or is not favorable for a parent-child and child-child comparison of load balancing metrics.

In step 481, after all children have been processed for a particular parent network group, processing proceeds to step 484 at which point the content distribution paths 225 have become more balanced due to the reassignment of child network groups from a particular parent network group that served too many child network groups before application of the tree balancing algorithm. It is to be understood that step 481 can take into account other considerations, such as how many children a parent already has, when performing the load balancing operation. In this manner, embodiments of the invention can formulate optimal content distribution paths even in situations where a particular network group is assigned many child network groups during application of the content distribution path determination technique explained above with respect to FIGS. 5 and 6.

The aforementioned load balancing algorithm is given by way of example only. This example requires that child groups are processed in relation to the parent in order of their ordered or assigned metric, such that the child group closest to the parent is handled first, the next closest is handled second, and so on. Once a group is made into a child, the algorithm will not reconsider it. Thus if we want content to move from the United States to Europe and then to Africa and these are ordered 1, 2 and 3, but we handle Africa first (i.e., out of order) in step 481, Africa will become a descendant of the United States and the path will be incorrect. Accordingly, by ordering the groups, the proper paths are provided for. It is to be understood that the above example of load balancing is not limiting of embodiments of the invention.

Using the aforementioned processing techniques, embodiments of the invention can significantly enhance the ability to define content distribution data paths within a networked topology. By accounting for such conditions such as the existence of firewalls and for the existence of too many selected network groups receiving their content from a particular network group, inefficiencies can be significantly avoided and possibly eliminated altogether. In addition, the general operation of the processing of embodiments of the invention as explained with respect to FIGS. 4 and 5 allows embodiments of the invention to define ideal or optimal data distribution paths between root network groups and selected non-root network groups.

Those skilled in the art will understand that there can be many variations made to the embodiments explained above while still achieving the same objective of those embodiments and the invention in general. As an example, rearrangement of the processing steps in the flow charts may be performed by those skilled in the art while still achieving the objectives of embodiments of the invention as explained herein. Such variations are intended to be covered by the scope of this invention. As such, the foregoing description of embodiments of the invention is not intended to be limiting. Rather, any limitations to the invention are presented in the following claims.

What is claimed is:

1. A method for establishing a data distribution path for content within a content distribution network, the method comprising the steps of:

receiving a network topology definition defining at least one hierarchical interconnection of network groups, each network group comprising at least one content engine;

receiving a channel definition comprising a selection of a plurality of content engines that are to distribute content within the content distribution network, the plurality of content engines in the channel definition selected from content engines within the network groups defined within the network topology definition;

determining an assignment of at least one root content engine within the channel definition; and applying a content distribution path determination technique to the network topology definition in relation to the channel definition to determine a set of content distribution paths in the content distribution network to be used for distribution of content from the at least one root content engine to the plurality of content engines defined in the channel definition.

2. The method of claim 1 wherein:

each network group in the network topology definition containing one of the at least one root content engine is a root network group;

each network group in the network topology definition that does not contain one of the at least one root content engine but that contains a selection of at least one content engine in the channel definition is a non-root network group;

wherein the step of applying a content distribution path determination technique comprises the step of determining an ideal data distribution path from each non-root network group to at least one root network group in the network topology definition.

3. The method of claim 2 wherein:

each network group in the network topology that contains a selected content engine within the channel definition is a selected network group;

each network group in the network topology that does not contain a selected content engine within the channel definition is a non-selected network group; and wherein the step of determining an ideal data distribution path comprises the step of selecting the ideal data distribution path to include only selected network groups.

4. The method of claim 3 wherein the step of determining an ideal data distribution path from each non-root network group to at least one root network group in the network topology definition comprises the steps of:

for each non-root network group that is a selected network group, performing the steps of:

determining if the non-root network group shares an ancestor selected network group with the at least one root network group in the network topology; and if the non-root network group shares an ancestor selected network group with the at least one root network group, then defining the ideal data distribution path from the non-root network group to the at least one root network group to include all selected groups interconnected by a path of links in the network topology beginning at the non-root network group and extending to the ancestor selected network group and then extending from the ancestor selected network group to the at least one root group that shared the ancestor selected network group with the non-root network group.

5. The method of claim 4 wherein the ancestor selected network group shared by the non-root network group and the at least one root network group is a lowest common ancestor selected network group.

6. The method of claim 3 wherein the step of determining an ideal data distribution path from each non-root network group to at least one root network group in the network topology definition comprises the steps of:

for each non-root network group that is a selected network group, performing the steps of:

determining if the non-root network group does not share an ancestor selected network group with the at least one root network group in the network topology; and if the non-root network group does not share an ancestor selected network group with the at least one root network group, then defining the ideal data distribution path from the non-root network group to the at least one root network group to include all selected groups interconnected by a path of links in the network topology beginning at the non-root network group and extending to highest ancestor network group associated with the non-root network group and then extending to the highest ancestor network group associated with the at least one root group, and then extending from the highest ancestor network group associated with the at least one root group to the at least one root group.

7. The method of claim 6 wherein the highest ancestor network group associated with the at least one root network group is the highest selected ancestor network group associated with the at least one root network group.

8. The method of claim 1 wherein the step of receiving a network topology definition defining at least one hierarchical interconnection of network groups comprises the steps of:
  obtaining identities of a set of content engines that define a network group, each identified content engine being able to communicate with other identified content engines in the network group;
  repeating the step of obtaining identities of a set of content engines that define a network group in order to define a plurality of network groups within the network topology; and
  for each network group that is not a top level network group in the hierarchical interconnection of network groups, obtaining only one link definition between that network group and only one parent network group, the one link definition allowing any content engine in that network group to communicate with any content engine in the one parent group.

9. The method of claim 6 wherein the step of determining an assignment of at least one root content engine within the channel definition comprises the step of:
  designating, as the at least one root content engine, at least one content engine within the channel definition that exists in a network group that is highest in the at least one hierarchical interconnection of network groups.

10. The method of claim 1 wherein the step of determining an assignment of at least one root content engine within the channel definition is performed automatically based on at least one of:
  a performance metric associated with the at least one content engine; and
  a bandwidth metric associated with the network group that contains the at least one content engine.

11. The method of claim 1 comprising the steps of:
  receiving, at the at least one root content engine, content to be distributed to the plurality of content engines defined in the channel definition;
  distributing, from the at least one root content engine, the content to network groups containing content engines defined in the channel definition using the set of content distribution paths determined from the step of applying a content distribution path determination technique.

12. The method of claim 1 wherein the steps of receiving a network topology definition, receiving a channel definition, determining an assignment of at least one root content engine, and applying a content distribution path determination technique are performed locally within at least one computerized device and wherein the method comprises the steps of:
  disseminating the set of content distribution paths to at least a portion of the plurality of content engines defined in the channel definition such that each content engine in the at least a portion of the plurality of content engines can determine a distribution path to use to disseminate content within the content distribution network from the at least one root content engine.

13. The method of claim 1 wherein each of the content engines defined in the channel definition performs the steps of receiving a network topology definition, receiving a channel definition, determining an assignment of at least one root content engine, and applying a content distribution path determination technique such that each content engine in the channel definition independently determines a distribution path to use to disseminate content within the content distribution network from the at least one root content engine.

14. The method of claim 1 comprising the step of:
  identifying at least one of:
    a firewall condition in the channel definition in which at least two content engines within the channel definition are capable of communicating in only one direction with respect to the location of the at least one root content engine within the channel definition;
    an efficiency condition indicating inefficiencies in transferring content in the set of distribution paths; and
    a tree-restructuring condition in which the set of distribution paths are not optimally organized; and
  in response to the step of identifying, applying a tree restructuring correction technique to restructure the set of distribution paths for the parent network group.

15. The method of claim 14 wherein one of the at least two content engines is an at least one root content engine and wherein the step of identifying a firewall condition determines that communication between the at least one root content engine is capable only in a direction that is opposite of a direction required for distribution of content from the at least one root content engine.

16. The method of claim 1 comprising the steps of:
  determining, for selected parent network groups in the network topology, if a number of selected child network groups for that selected parent network group exceeds a predetermined threshold;
  identifying a tree restructuring condition; and
  applying a tree restructuring correction technique to restructure the set of distribution paths for the parent network group.

17. The method of claim 15 wherein the step of applying a tree restructuring correction technique comprises:
  comparing a metric of each child network group to the parent network group and to at least one other child network group to determine if that child network group should be a child of that patent network group, and if so, assigning that child network group as a child of the parent network group, and if that child network group should be a child of another child network group, then assigning that child network group as a child of the another child network group.

18. A computerized device comprising:
  at least one communications interface;
  a memory;
  a processor; and
  an interconnection mechanism coupling the at least one communications interface, the memory and the processor; and
  wherein the memory is encoded with a path manager application that when performed on the processor, produces a path manager process that causes the computerized device to establish a data distribution path for content within a content distribution network by performing the steps of:
  receiving a network topology definition defining at least one hierarchical interconnection of network groups, each network group comprising at least one content engine;
  receiving a channel definition comprising a selection of a plurality of content engines that are to distribute content within the content distribution network, the plurality of content engines in the channel definition selected from content engines within the network groups defined within the network topology definition;

determining an assignment of at least one root content engine within the channel definition; and applying a content distribution path determination technique to the network topology definition in relation to the channel definition to determine a set of content distribution paths in the content distribution network to be used for distribution of content from the at least one root content engine to the plurality of content engines defined in the channel definition.

19. The computerized device of claim 18 wherein:

each network group in the network topology definition containing one of the at least one root content engine is a root network group;

each network group in the network topology definition that does not contain one of the at least one root content engine but that contains a selection of at least one content engine in the channel definition is a non-root network group;

wherein when the computerized device performs the step of applying a content distribution path determination technique the computerized device performs the step of determining an ideal data distribution path from each non-root network group to at least one root network group in the network topology definition.

20. The computerized device of claim 19 wherein:

each network group in the network topology that contains a selected content engine within the channel definition is a selected network group;

each network group in the network topology that does not contain a selected content engine within the channel definition is a non-selected network group; and wherein when the computerized device performs the step of determining an ideal data distribution path the computerized device performs the step of selecting the ideal data distribution path to include only selected network groups.

21. The computerized device of claim 20 wherein when the computerized device performs the step of determining an ideal data distribution path from each non-root network group to at least one root network group in the network topology definition the computerized device performs the steps of:

for each non-root network group that is a selected network group, performing the steps of:

determining if the non-root network group shares an ancestor selected network group with the at least one root network group in the network topology; and if the non-root network group shares an ancestor selected network group with the at least one root network group, then defining the ideal data distribution path from the non-root network group to the at least one root network group to include all selected groups interconnected by a path of links in the network topology beginning at the non-root network group and extending to the ancestor selected network group and then extending from the ancestor selected network group to the at least one root group that shared the ancestor selected network group with the non-root network group.

22. The computerized device of claim 20 wherein the ancestor selected network group shared by the non-root network group and the at least one root network group is a lowest common ancestor selected network group.

23. The computerized device of claim 20 wherein when the computerized device performs the step of determining an ideal data distribution path from each non-root network group to at least one root network group in the network topology definition the computerized device performs the steps of:

for each non-root network group that is a selected network group, performing the steps of:

determining if the non-root network group does not share an ancestor selected network group with the at least one root network group in the network topology; and if the non-root network group does not share an ancestor selected network group with the at least one root network group, then defining the ideal data distribution path from the non-root network group to the at least one root network group to include all selected groups interconnected by a path of links in the network topology beginning at the non-root network group and extending to highest ancestor network group associated with the non-root network group and then extending to the highest ancestor network group associated with the at least one root group, and then extending from the highest ancestor network group associated with the at least one root group to the at least one root group.

24. The computerized device of claim 23 wherein the highest ancestor network group associated with the at least one root network group is the highest selected ancestor network group associated with the at least one root network group.

25. The computerized device of claim 18 wherein when the computerized device performs the step of receiving a network topology definition defining at least one hierarchical interconnection of network groups the computerized device performs the steps of:

obtaining identities of a set of content engines that define a network group, each identified content engine being able to communicate with other identified content engines in the network group;

repeating the step of obtaining identities of a set of content engines that define a network group in order to define a plurality of network groups within the network topology; and for each network group that is not a top level network group in the hierarchical interconnection of network groups, obtaining only one link definition between that network group and only one parent network group, the one link definition allowing any content engine in that network group to communicate with any content engine in the one parent group.

26. The computerized device of claim 18 wherein when the computerized device performs the step of determining an assignment of at least one root content engine within the channel definition the computerized device performs the step of:

designating, as the at least one root content engine, at least one content engine within the channel definition that exists in a network group that is highest in the at least one hierarchical interconnection of network groups.

27. The computerized device of claim 18 wherein the step of determining an assignment of at least one root content engine within the channel definition is performed automatically by the computerized device based on at least one of:

a performance metric associated with the at least one content engine; and a bandwidth metric associated with the network group that contains the at least one content engine.

28. The computerized device of claim 18 wherein the computerized device performs the steps of:
   receiving, at the at least one root content engine, content to be distributed to the plurality of content engines defined in the channel definition;
   distributing, from the at least one root content engine, the content to network groups containing content engines defined in the channel definition using the set of content distribution paths determined from the step of applying a content distribution path determination technique.

29. The computerized device of claim 18 wherein when the computerized device performs the step of receiving a network topology definition, receiving a channel definition, determining an assignment of at least one root content engine, and applying a content distribution path determination technique are performed locally within at least one computerized device and wherein the computerized device further performs the step of:
   disseminating the set of content distribution paths to at least a portion of the plurality of content engines defined in the channel definition such that each content engine in the at least a portion of the plurality of content engines can determine a distribution path to use to disseminate content within the content distribution network from the at least one root content engine.

30. The computerized device of claim 18 wherein each of the content engine defined in the channel definition performs the steps of receiving a network topology definition, receiving a channel definition, determining an assignment of at least one root content engine, and applying a content distribution path determination technique such that each content engine in the channel definition independently determine a distribution path to use to disseminate content within the content distribution network from the at least one root content engine.

31. The computerized device of claim 18 wherein the computerized device performs the step of:
   identifying at least one of:
      a firewall condition in the channel definition in which at least two content engines within the channel definition are capable of communicating in only one direction with respect to the location of the at least one root content engine within the channel definition;
      an efficiency condition indicating inefficiencies in transferring content in the set of distribution paths; and
      a tree-restructuring condition in which the set of distribution paths are not optimally organized; and
   in response to the step of identifying, the computerized device applies a tree restructuring correction technique to restructure the set of distribution paths for the parent network group.

32. The computerized device of claim 31 wherein one of the at least two content engines is an at least one root content engine and wherein when the computerized device performs the step of identifying a firewall condition, the computerized device performs the step determining that communication between the at least one root content engine is capable only in a direction that is opposite of a direction required for distribution of content from the at least one root content engine.

33. The computerized device of claim 18 wherein the computerized device performs the step of:
   determining, for selected parent network groups in the network topology, if a number of selected child network groups for that selected parent network group exceeds a predetermined threshold, and if so, performing the steps of:
   identifying a tree restructuring condition; and
   applying a tree restructuring correction technique to restructure the set of distribution paths for the parent network group.

34. The computerized device of claim 33 wherein when the computerized device performs the step of applying a tree restructuring correction technique, the computerized device:
   compares a metric of each child network group to the parent network group and to at least one other child network group to determine if that child network group should be a child of that patent network group, and if so, assigning that child network group as a child of the parent network group, and if that child network group should be a child of another child network group, then assigning that child network group as a child of the another child network group.

35. A computer program product having a computer-readable medium including computer program logic encoded thereon that, when performed in a computerized device having a coupling of a memory, a processor, and at least one communications interface, provides a method for establishing a data distribution path for content within a content distribution network by causing the computerized device to perform the operations of:
   receiving a network topology definition defining at least one hierarchical interconnection of network groups, each network group comprising at least one content engine;
   receiving a channel definition comprising a selection of a plurality of content engines that are to distribute content within the content distribution network, the plurality of content engines in the channel definition selected from content engines within the network groups defined within the network topology definition;
   determining an assignment of at least one root content engine within the channel definition; and
   applying a content distribution path determination technique to the network topology definition in relation to the channel definition to determine a set of content distribution paths in the content distribution network to be used for distribution of content from the at least one root content engine to the plurality of content engines defined in the channel definition.

* * * * *